(12) United States Patent
Hwang

(10) Patent No.: US 11,574,116 B2
(45) Date of Patent: Feb. 7, 2023

(54) APPARATUS AND METHOD FOR PROVIDING SUMMARIZED INFORMATION USING AN ARTIFICIAL INTELLIGENCE MODEL

(71) Applicant: SAMSUNG ELECTRONICS CO., LTD., Suwon-si (KR)

(72) Inventor: Jin-young Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/327,036

(22) Filed: May 21, 2021

(65) Prior Publication Data

US 2021/0279407 A1    Sep. 9, 2021

Related U.S. Application Data

(63) Continuation of application No. 16/909,574, filed on Jun. 23, 2020, now Pat. No. 11,017,156, which is a
(Continued)

(30) Foreign Application Priority Data

Jan. 19, 2018    (KR) ........................ 10-2018-0007169

(51) Int. Cl.
*G06F 17/00*    (2019.01)
*G06F 40/16*    (2020.01)
(Continued)

(52) U.S. Cl.
CPC ............ *G06F 40/16* (2020.01); *G06F 16/338* (2019.01); *G06F 16/345* (2019.01);
(Continued)

(58) Field of Classification Search
CPC ...... G06F 40/16; G06F 40/216; G06F 40/289; G06F 16/338; G06F 16/345;
(Continued)

(56) References Cited

U.S. PATENT DOCUMENTS

| 5,907,841 | A  | 5/1999 | Sumita et al. |
| 6,205,456 | B1 | 3/2001 | Nakao |

(Continued)

FOREIGN PATENT DOCUMENTS

| CN | 106415535 A | 2/2017 |
| JP | 4326713 B2  | 9/2009 |

(Continued)

OTHER PUBLICATIONS

Leskovec, Juriji, et al, "Learning Sub-structures of Document Semantic Graphs for Document Summarization", 2004, downloaded from www-cs-faculty.stanford.edu, pp. 1-9. (Year: 2004).
(Continued)

*Primary Examiner* — Laurie A Ries
(74) *Attorney, Agent, or Firm* — Sughrue Mion, PLLC

(57) ABSTRACT

An artificial intelligence system using a machine learning algorithm for providing summary information of a document input to an artificial intelligence learning model trained to obtain summary information.

19 Claims, 24 Drawing Sheets

Related U.S. Application Data continuation of application No. 16/052,144, filed on Aug. 1, 2018, now Pat. No. 10,699,062.

(60) Provisional application No. 62/539,686, filed on Aug. 1, 2017.

(51) Int. Cl.

| | |
|---|---|
| *G06N 3/08* | (2006.01) |
| *G06F 16/34* | (2019.01) |
| *G06F 16/338* | (2019.01) |
| *G06N 3/04* | (2006.01) |
| *G06F 40/216* | (2020.01) |
| *G06F 40/289* | (2020.01) |
| *G06V 30/40* | (2022.01) |
| *G06N 5/04* | (2006.01) |

(52) U.S. Cl.
CPC .......... *G06F 40/216* (2020.01); *G06F 40/289* (2020.01); *G06N 3/0454* (2013.01); *G06N 3/08* (2013.01); *G06N 3/084* (2013.01); *G06V 30/40* (2022.01); *G06N 3/0445* (2013.01); *G06N 5/046* (2013.01)

(58) Field of Classification Search
CPC .... G06K 9/00442; G06N 3/0454; G06N 3/08; G06N 3/084; G06N 3/044; G06N 5/046; G06V 10/82; G06V 30/40
See application file for complete search history.

(56) References Cited

U.S. PATENT DOCUMENTS

| | | | | |
|---|---|---|---|---|
| 6,289,337 | B1* | 9/2001 | Davies | G06F 16/335 |
| | | | | 707/999.005 |
| 6,601,026 | B2 | 7/2003 | Appelt et al. | |
| 6,694,315 | B1* | 2/2004 | Grow | G06Q 10/109 |
| 7,152,064 | B2 | 12/2006 | Bourdoncle et al. | |
| 7,512,900 | B2* | 3/2009 | Lynch | G06F 16/3334 |
| | | | | 715/708 |
| 7,912,701 | B1 | 3/2011 | Gray et al. | |
| 8,335,754 | B2 | 12/2012 | Dawson et al. | |
| 8,627,403 | B1* | 1/2014 | Kirshenbaum | G06F 21/604 |
| | | | | 726/1 |
| 8,688,694 | B2* | 4/2014 | Dexter | G06F 16/951 |
| | | | | 707/726 |
| 8,990,235 | B2 | 3/2015 | King et al. | |
| 9,047,283 | B1 | 6/2015 | Zhang et al. | |
| 9,535,960 | B2 | 1/2017 | Guo et al. | |
| 9,792,357 | B2* | 10/2017 | Jain | G06F 16/338 |
| 10,007,882 | B2* | 6/2018 | Belenzon | G06N 7/005 |
| 10,169,419 | B2* | 1/2019 | Alonso | G06F 16/24556 |
| 2002/0186241 | A1* | 12/2002 | Kohda | G06F 16/93 |
| | | | | 715/744 |
| 2003/0069877 | A1 | 4/2003 | Grefenstette et al. | |
| 2005/0096897 | A1* | 5/2005 | Ando | G06F 40/30 |
| | | | | 704/4 |
| 2005/0108200 | A1 | 5/2005 | Meik et al. | |
| 2005/0246410 | A1* | 11/2005 | Chen | G06F 16/345 |
| | | | | 709/200 |
| 2006/0036596 | A1 | 2/2006 | Zhang et al. | |
| 2006/0101012 | A1 | 5/2006 | Carson et al. | |
| 2006/0161542 | A1 | 7/2006 | Cucerzan et al. | |
| 2006/0253418 | A1 | 11/2006 | Charnock et al. | |
| 2007/0208719 | A1 | 9/2007 | Tran | |
| 2009/0193350 | A1 | 7/2009 | Carter et al. | |
| 2009/0319508 | A1 | 12/2009 | Yih et al. | |
| 2010/0169299 | A1* | 7/2010 | Pollara | G06F 40/284 |
| | | | | 707/E17.022 |
| 2010/0205541 | A1* | 8/2010 | Rapaport | G06Q 30/02 |
| | | | | 715/753 |
| 2010/0228693 | A1 | 9/2010 | Dawson et al. | |
| 2010/0312769 | A1 | 12/2010 | Bailey et al. | |
| 2010/0332583 | A1* | 12/2010 | Szabo | G06F 16/248 |
| | | | | 709/202 |
| 2011/0060983 | A1 | 3/2011 | Cai et al. | |
| 2011/0099134 | A1 | 4/2011 | Shirwadkar et al. | |
| 2011/0184827 | A1 | 7/2011 | Hubert | |
| 2012/0047131 | A1* | 2/2012 | Billawala | G06F 16/34 |
| | | | | 707/723 |
| 2012/0303357 | A1 | 12/2012 | Yasin | |
| 2013/0191392 | A1* | 7/2013 | Kumar | G06F 16/358 |
| | | | | 707/748 |
| 2013/0191735 | A1* | 7/2013 | Kumar | G06F 16/358 |
| | | | | 715/254 |
| 2014/0201217 | A1* | 7/2014 | Hatami-Hanza | G06F 40/30 |
| | | | | 707/801 |
| 2014/0250375 | A1* | 9/2014 | Malik | G06F 16/345 |
| | | | | 715/254 |
| 2015/0046783 | A1 | 2/2015 | O'Donoghue et al. | |
| 2015/0081277 | A1 | 3/2015 | Behi | |
| 2015/0293976 | A1 | 10/2015 | Guo et al. | |
| 2015/0356061 | A1* | 12/2015 | Rampson | G06F 40/18 |
| | | | | 715/230 |
| 2016/0140221 | A1 | 5/2016 | Park et al. | |
| 2016/0170982 | A1 | 6/2016 | Djuric et al. | |
| 2016/0210352 | A1 | 7/2016 | Luo | |
| 2017/0124034 | A1* | 5/2017 | Upadhyay | H04L 51/046 |
| 2017/0147544 | A1* | 5/2017 | Modani | G06F 16/4393 |
| 2017/0277668 | A1 | 9/2017 | Luo et al. | |
| 2017/0280208 | A1 | 9/2017 | Mishra et al. | |
| 2018/0293235 | A1 | 10/2018 | Ryger et al. | |
| 2018/0349511 | A1 | 12/2018 | Kleiman-Weiner et al. | |
| 2018/0349517 | A1 | 12/2018 | Kleiman-Weiner et al. | |
| 2019/0034430 | A1 | 1/2019 | Das et al. | |
| 2019/0205465 | A1 | 7/2019 | Kulkarni | |
| 2019/0221204 | A1 | 7/2019 | Zhang et al. | |
| 2019/0244119 | A1 | 8/2019 | Farri et al. | |

FOREIGN PATENT DOCUMENTS

| | | |
|---|---|---|
| JP | 2010-191851 A | 9/2010 |
| KR | 10-1583073 B1 | 1/2016 |
| KR | 10-2016-0058587 A | 5/2016 |

OTHER PUBLICATIONS

Communication dated Mar. 19, 2021 by the European Patent Office in European Patent Application No. 18840709.2.
Second Notice of Allowance issued in parent U.S. Appl. No. 16/909,574 dated Jan. 22, 2021.
Notice of Allowance issued in parent U.S. Appl. No. 16/909,574 dated Sep. 15, 2020.
"It seems that a highlight search is changed to be applied automatically when searching information on Naver", Naver Blog, Jul. 4, 2012, retrieved from the internet at URL: <http://blog.naver.com/coleng/50144827786>, retrieved on Jun. 16, 2017.
International Search Report dated Nov. 14, 2018, issued by the International Searching Authority in International Application No. PCT/KR2018/008759 (PCT/ISA/210).
Written Opinion dated Nov. 14, 2018, issued by the International Searching Authority in International Application No. PCT/KR2018/008759 (PCT/ISA/237).
Communication dated Feb. 7, 2020, issued by the European Patent Office for European Patent Application No. 18840709.2.
Communication dated Oct. 27, 2021, issued by the European Patent Office in European Application No. 18840709.2.
Communication dated Apr. 1, 2022 issued by the European Patent Office in European Application No. 18 840 709.2.
Communication dated Sep. 22, 2022 issued by the Korean Intellectual Property Office in Korean Patent Application No. 10-2018-0007169.
Communication dated Nov. 9, 2022 issued by the China National Intellectual Property Administration in Chinese Patent Application No. 201880035705.3.

* cited by examiner

FIG. 11

Controversial remarks about diplomatic newsflash

Warned against the diplomatic newsflash...complicated Blue House
We did not pre-arrange the diplomatic newsflash... The newsflash is within the Denuclearization of North Korea issue, President saying "I advise only, and the Blue House decides"

⊙ SUMMARY —1110

Bilateral negotiations mean giving and receiving, Washington Emphasis on scholarly commitment
US Remarks are considered a hot issue, attention to what he is saying
US, diplomatic newsflash will be in controversy, showing action not to irritate U.S. ahead of U.S.-Korea Summit
The Blue House mitigated the controversial issue of diplomatic newsflash
The Blue House mentioned about the diplomatic newsflash, Hwang Kyo-an said, "security is difficult to handle"
The Blue House tried to mitigate the "diplomatic newsflash"... a red light for reestablishing U.S.-Korea relationship
Noise regarding diplomatic newsflash, vacant seat for the Senior Staff of Security House, unstable diplomatic security line
The Blue House officially announced about the diplomatic newsflash ⇩ (a)

North Korea, nuclear, missile, U.S.-Korea joint military drills, weapon placement, U.S.-Korea Summit ⇩ (b)

North Korea, nuclear weapons, missiles, US-ROK military drills, and weapons are key means of Terminal High Altitude Area Defense (THAAD) up to 40-150 km in range and up to 200 km in range. The shot ballistic missile approaches a target and can shoot down the target at a final stage. This is the core defense system of Missile Defense (MD) of the U.S. deployment, the US-Korea summit (c)

FIG. 12

"Caution and caution"... President, Reaction to Growing Pressure on Weapons

 SUMMARY

Response expected so that detailed issue is not made

Seoul = News 1) Kim, Hyun, Seo, Mi-seon
Amid the nearing Summit, there is a growing attention about how the President will reaction to the weapon disposition issue which is raised as a key issue.

According to the Blue House, on 27th, the President will have a Summit along with the U.S. President on 30th.

The agendas announced by the Blue House include a way to further develop Korea-U.S. alliance, a way to collaborate to solve the nuclear issue of North Korea, realization of peace in Korean Peninsula, and growing cooperation in economy.

The Blue House described that since the agendas of the Summit focus on a wide-range issue and thus, the weapon issue, which seems a narrower issue, is not included in the agendas.

However, President Trump who are tend to speak abrupt issues, there are growing possibilities that the aforementioned issue can be an agenda in an irregular manner.

In particular, due to the death accident in the U.S., there is a growing tendency of hardline toward North Korea, and earlier placement of weapons has been requested. So, there seems a possibility that this issue will be discussed.

~1210

(a)

"Caution and caut
Growing Pressure

On 19th, the Blue House warned the special adviser on unification diplomacy and security that the controversial North Korean nuclear talks could be reduced if the North suspends its nuclear weapons test. It is because of the concern that if the US-Korea relationship is wiped out due to the disposition of the weapons, exposing the differences to the solution of the North Korea, cold water will be poured on the Korean-US summit meeting that is approaching ten days later. However, the Blue House did not deny the contents of the remarks of the diplomatic newsflash, revealing the intricate emotion.

~1220

Response expected so that detaile
Seoul = News 1) Kim, Hyun, Seo,
Amid the nearing Summit, there is
reaction to the weapon disposition issue which is raised as a key issue.

According to the Blue House, on 27th, the President will have a Summit along with the U.S. President on 30th.

The agendas announced by the Blue House include a way to further develop Korea-U.S. alliance, a way to collaborate to solve the nuclear issue of North Korea, realization of peace in Korean Peninsula, and growing cooperation in economy.

The Blue House described that, since the agendas of the Summit focus on a wide-range issue and thus, the weapon issue, which seems a narrower issue, is not included in the agendas.

However, President Trump who are tend to speak abrupt issues, there are growing possibilities that the aforementioned issue can be an agenda in an irregular manner.

In particular, due to the death accident in the U.S., there is a growing tendency of hardline toward North Korea, and earlier placement of weapons has been requested. So, there seems a possibility that this issue will be discussed.

(b)

(a)        (b)

APPARATUS AND METHOD FOR PROVIDING SUMMARIZED INFORMATION USING AN ARTIFICIAL INTELLIGENCE MODEL

CROSS-REFERENCE TO RELATED APPLICATIONS

This application is a continuation of U.S. application Ser. No. 16/909,574 filed on Jun. 23, 2020, which is a continuation of U.S. application Ser. No. 16/052,144 filed on Aug. 1, 2018 (now U.S. Pat. No. 10,699,062), which claims priority from Korean Patent Application No. 10-2018-0007169, filed on Jan. 19, 2018, in the Korean Intellectual Property Office, and U.S. Provisional Patent Application No. 62/539,686, filed on Aug. 1, 2017, in the U.S. Patent and Trademark Office, the disclosures of which are incorporated herein by reference in their entireties.

BACKGROUND

1. Field

Embodiments of the present disclosure relate to an electronic apparatus for providing summarized information and a controlling method thereof and, more particularly, to an electronic apparatus for providing summarized information regarding at least one of a plurality of documents that are searched based on a keyword and a controlling method thereof.

Embodiments of the present disclosure relate to an artificial intelligence (AI) system which copies functions such as recognition and determination of human brain using machine learning algorithm and an application thereof.

2. Description of the Related Art

Recently, artificial intelligence (AI) systems that mimic human-level intelligence have been widely used in various fields. The AI system, unlike a conventional rule-based smart system, represents a system that learns, judges, and evolves. As use of the AI increases, a recognition correspondingly increases, and thus user preferences when analyzed under the AI system can be understood more accurately. Therefore, rule-based smart systems have been gradually replaced with deep learning-based AI systems.

AI technology is composed of machine learning (for example, deep learning) and elementary technology utilizing machine learning.

Machine learning may be described as an algorithm that classifies data and learns the features of input data. Elementary technology may be described as technology that mimics cognitive functions, such as recognition and judgment of the human brain, using a machine learning algorithm such as deep learning, consisting of technical fields including linguistic understanding, visual understanding, inference/prediction, knowledge presentation, operation control, and so on.

The functions of artificial intelligence technology are applied in various fields. Linguistic understanding is a technology for recognizing, applying/processing human language/characters and includes natural language processing, machine translation, dialogue system, question & answer, speech recognition/synthesis, and the like. Visual understanding is a technique for recognizing and processing objects as human vision, including object recognition, object tracking, image search, human recognition, scene understanding, spatial understanding, image enhancement, and the like. Inference prediction is a technique for judging and logically inferring and predicting information, including knowledge/probability based inference, optimization prediction, preference-based planning, and recommendation. Knowledge representation is a technology for automating human experience information into knowledge data, including knowledge building (data generation/classification) and knowledge management (data utilization). Motion control is a technique for controlling the autonomous running of the vehicle and the motion of the robot, including motion control (navigation, collision, driving), operation control (behavior control), and the like.

In recent years, techniques for summarizing documents and providing summary information (for example, summary text) have been developed. In particular, recent electronic apparatuses or programs can provide summarized information by summarizing documents using summary models obtained through artificial intelligence learning.

Therefore, there is a need to provide a user with various user experiences through a summarization function to summarize a document using a summarization model.

SUMMARY

Embodiments of the present disclosure provide an electronic device for selecting at least one of a plurality of documents that are a returned as a result of a search based on a keyword and providing summary information of the documents, and a controlling method thereof.

According to an embodiment, there is provided a method of a server providing summary information using an artificial intelligence learning model including, in response to receiving a search request comprising a keyword, searching for a plurality of documents based on the keyword; in response to receiving a request for summary information of a document among the plurality of documents, obtaining the summary information of the document from an artificial intelligence learning model trained to obtain the summary information of the document using the document as input; and providing the summary information of the document to the electronic device.

According to an embodiment, there is provided a computer-readable media storing thereon a program of executing a method for providing summary information using an artificial intelligence learning model including, in response to receiving a search request comprising a keyword, searching for a plurality of documents based on the keyword; in response to receiving a request for summary information of a document among the plurality of documents, obtaining the summary information of the document from an artificial intelligence learning model trained to obtain the summary information of the document using the document as input; and providing the summary information of the document to the electronic device.

According to an embodiment, there is provided a method of providing summary information using an artificial intelligence learning model including receiving input of a keyword while a first document is being displayed; in response to receiving a search request for searching for documents based on the keyword, searching for a plurality of documents based on the keyword; in response to receiving a user instruction to insert summary information regarding a second document among the plurality of documents into the first document, obtaining summary information of the second document related to the keyword from an artificial intelligence learning model trained to obtain the summary information of the second document using the second document as input; and inserting the obtained summary information of the second document into the first document.

According to an embodiment, there is provided a computer-readable recordable storing thereon stores a program for executing a method of providing summary information using an artificial intelligence learning model including receiving input of a keyword while a first document is being displayed, and displaying the keyword along with the first document; in response to receiving a search request for searching for documents based on the keyword, searching for a plurality of documents based on the keyword; in response to receiving a user instruction to insert summary information regarding a second document among the plurality of documents into the first document, obtaining summary information of the second document related to the keyword from an artificial intelligence learning model trained to obtain the summary information of the second document using the second document as input; and inserting the obtained summary information of the second document into the first document.

By the various embodiments as described above, an electronic device may obtain summary information related to a keyword and provide various user experiences using obtained summary information. In addition, the electronic device may provide summary information that is suitable for tendency of a user or intellectual capacity

BRIEF DESCRIPTION OF THE DRAWINGS

The above and/or other aspects of the present disclosure will be more apparent by describing certain embodiments of the present disclosure with reference to the accompanying drawings, in which:

FIG. 11 is a diagram illustrating searching for a word included in a summary text according to an embodiment;

FIG. 12 is a diagram illustrating providing summary information according to an embodiment;

DETAILED DESCRIPTION OF THE EMBODIMENTS

Figure 1:
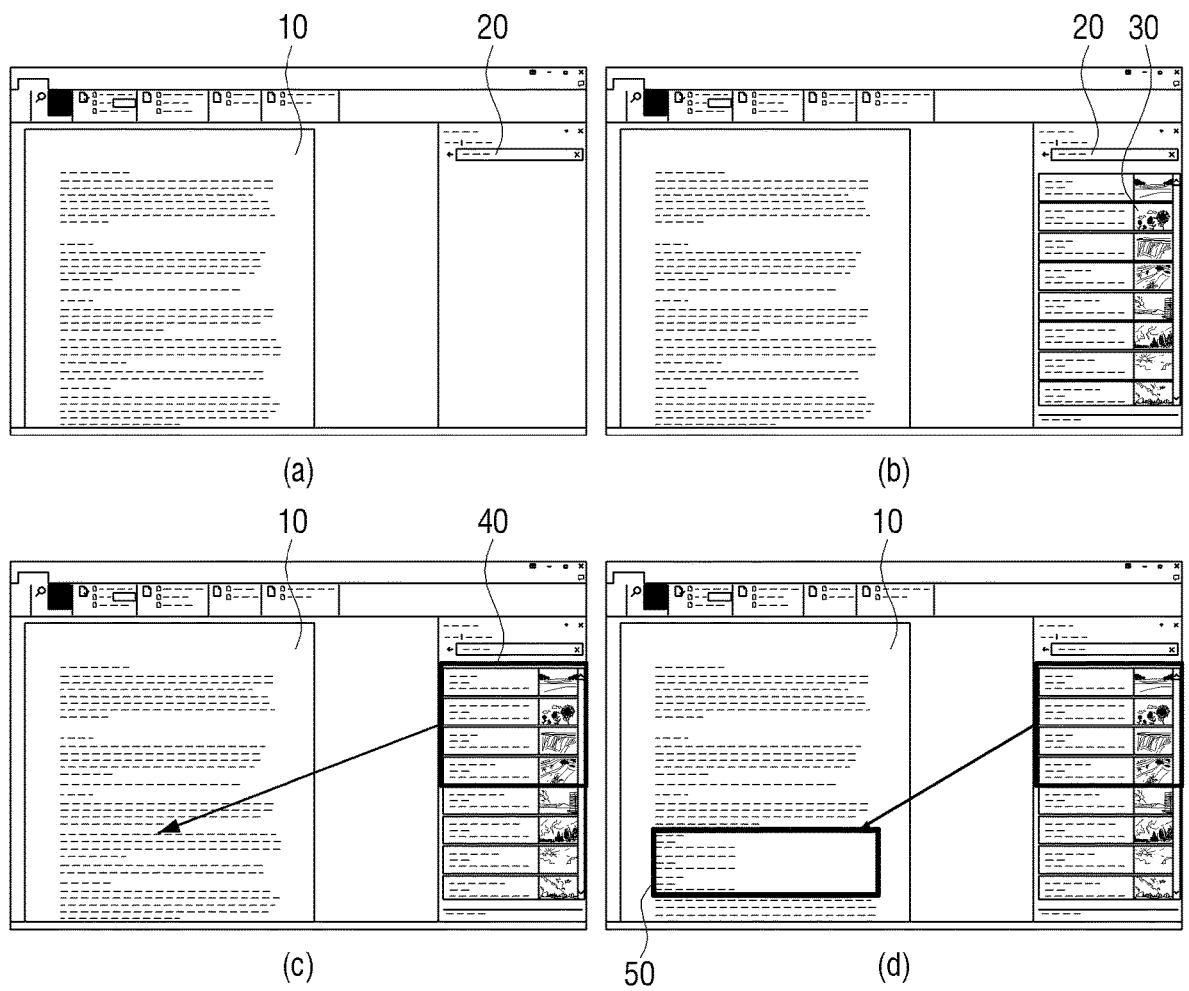
FIG. 1 is a use map of providing summary information according to an embodiment.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

In this document, the expressions "have," "may have," "including," or "may include" may be used to denote the presence of a feature (e.g., a numerical value, a function, an operation), and does not exclude the presence of additional features.

In this document, the expressions "A or B," "at least one of A and/or B," or "one or more of A and/or B," and the like include all possible combinations of the listed items. For example, "A or B," "at least one of A and B," or "at least one of A or B" includes (1) A only, (2) B only, or (3) A and B.

The terms such as "first," "second," and so on may be used to describe a variety of elements, but the elements should not be limited by these terms. The terms are used only for the purpose of distinguishing one element from another.

A component (e.g., a first component) "operatively or communicatively coupled with/to" another component (e.g., a second component) may be directly connected to the other element or may be connected via another element (e.g., a third element). On the other hand, when an element (e.g., a first element) is "directly connected" or "directly accessed" to another element (e.g., a second element), there is no other component (e.g. a third component) between the components.

Herein, the expression "configured to" can be used interchangeably with, for example, "suitable for," "having the capacity to," "designed to," "adapted to," "made to," or "capable of". The expression "configured to" does not necessarily mean "specifically designed to" in a hardware sense. Instead, under some circumstances, "a device configured to" may indicate that such a device can perform an operation along with another device or part. For example, the expression "a processor configured to perform A, B, and C" may indicate an exclusive processor (e.g., an embedded processor) to perform the corresponding operation, or a generic-purpose processor (e.g., a central processing unit (CPU) or application processor (AP)) that can perform the corresponding operations by executing one or more software programs stored in the memory device.

An electronic apparatus and an external device in accordance with various embodiments of the present disclosure may include at least one of, for example, smartphones, tablet PCs, mobile phones, video telephones, electronic book readers, desktop PCs, laptop PCs, netbook computers, workstations, servers, a PDA, a portable multimedia player (PMP), an MP3 player, a medical device, a camera, or a wearable device. A wearable device may include at least one of the accessory type (e.g., as a watch, a ring, a bracelet, a bracelet, a necklace, a pair of glasses, a contact lens or a head-mounted-device (HMD)); a fabric or a garment-embedded type (e.g., a skin pad or a tattoo); or a bio-implantable circuit. In some embodiments, the electronic apparatus may be, for example, a television, a digital video disk (DVD) player, audio, refrigerator, cleaner, ovens, microwaves, washing machines, air purifiers, set top boxes, home automation control panels, security control panels, media box (e.g., Samsung HomeSync™, Apple TV™, or Google TV™), game consoles (e.g., Xbox™, PlayStation™), electronic dictionary, electronic key, camcorder, or electronic frame.

In other embodiments, the electronic apparatus and the external device may include at least one of a variety of medical devices (e.g., various portable medical measurement devices such as a blood glucose meter, a heart rate meter, a blood pressure meter, or a temperature measuring device), magnetic resonance angiography (MRA), magnetic resonance imaging (MRI), computed tomography (CT), or ultrasonic wave device, etc.), navigation system, global navigation satellite system (GNSS), event data recorder (EDR), flight data recorder (FDR), automotive infotainment devices, marine electronic equipment (e.g., marine navigation devices, gyro compasses, etc.), avionics, security devices, car head units, industrial or domestic robots, drone, ATMs, points of sale of stores, or IoT devices (e.g., light bulbs, sensors, sprinkler devices, fire alarms, thermostats, street lights, toasters, exercise equipment, hot water tanks, heater, boiler, etc.).

In this disclosure, the term user may refer to a person who uses an electronic apparatus or an apparatus (e.g., artificial intelligence electronic apparatus).

As illustrated in FIGS. 1 and 2, an electronic apparatus 100 may display the first document 10 in the first area. At this time, the first document includes text and may further include an image and a video in addition to text. The electronic apparatus 100, while the first document 10 is being displayed in the first area 10, may receive a user instruction to input a keyword to a search window 20, as shown in (a) of FIG. 1. The electronic apparatus 100 may display a keyword on the search window 20 in response to a user instruction.

When a search command (for example, a command for selecting a search icon) for a keyword entered in the search window 20 is received, the electronic apparatus 100 searches for a plurality of documents based on the keyword. At this time, the electronic apparatus 100 can search a plurality of documents stored in the electronic apparatus 100 based on a keyword, but this is only exemplary, and a plurality of documents can be searched using an external server. The plurality of documents may be stored on the external server, or may be stored on one or more servers and/or devices.

The electronic apparatus 100 may display a list 30 identifying or indicating a plurality of documents that are returned as a result of the search in the second area while the first document 10 is being displayed in the first area, as shown in (b) of FIG. 1. At this time, the list 30 of documents can display a partial area including a keyword among text included in the plurality of documents, and can display a thumbnail image.

The electronic apparatus 100 may receive a user command for selecting at least one 40 of the plurality of documents included in the list 30 and inserting the selected at least one document 40 into the first document. As an example, the electronic apparatus 100 may receive a user command to select the at least one 40 of the documents included in the list 30 and drag the content thereof to a point of the first document, as shown in (c) of FIG. 1.

When a user command for selecting at least one of the plurality of documents and inserting the selected document into the first document 10 is received, the electronic apparatus 100 may acquire summary information summarizing the selected at least one document 40. At this time, the electronic apparatus 100 may input at least one document 40 to the AI learning model (for example, a document summary model) trained to obtain summary information regarding the selected at least one document 40. At this time, the summary information may include various information such as a summary text, a summary image, a summary video, and the like.

The AI learning model may generate summary information related to a keyword based on receiving a keyword as input. That is, the AI learning model may employ a keyword to generate summary information.

When a user command for inserting multiple documents among a plurality of documents into the first document 10 is received, the AI model may obtain summary information about the documents centering on a sentence (or text) commonly included in all the documents. That is, the AI learning model may generate summary information according to sentences (or texts, or any content) that are common to the multiple documents.

In addition, if the selected document 40 has a table of contents, the AI model may summarize the selected document based on the table of contents included in the selected document 40 and obtain summary information. That is, the artificial intelligence learning model may generate summary information according to the text or sentence included in the summary or the conclusion of the table of contents.

In one embodiment, the electronic apparatus 100 may display a user interface (UI) for setting the length of the summary information. At this time, if the length or tone of the summary information is set through the UI, the AI learning model can generate summary information based on the set tone and length. For example, if the UI is set to generate summary information in negative tone, the AI learning model may generate summary information by setting a high weight on negative words. As another example, if the UI is set to generate long summary information, the AI learning model may generate summary information by extracting more than a predetermined number of words or phrases for generating the summary information.

In another embodiment, the electronic apparatus 100 may obtain history information of a user, and the AI model may generate summary information based on user history information or demographic. Specifically, the AI learning model can set the tone or length of summary information based on user history information (e.g., user's political orientation, knowledge level, etc.). For example, if a user is determined to have a politically progressive tendency based on user history information, the AI learning model may be applied to a word having a progressive characteristic (for example, progress, welfare, distribution, etc.) to generate summary information. As another example, when a user is determined to have low expertise on the document based on the user history information, the AI learning model can generate summary information by favoring the use of simply words and more detailed explanations in the summary information.

If summary information is obtained, the electronic apparatus 100 may insert the obtained summary information into the first document 10. In particular, the electronic apparatus 100 may insert the summary information 50 at the point at which the user drag input of the first document 10 is indicated, as shown in (d) of FIG. 1.

At this time, the summary information 50 can be distinctively displayed from other texts in the first document 10 or other documents included in the list 30. For example, being distinctively displayed may include, for example, displaying to have different shades, brightness or complementary colors, displaying of the boundary of the summary information by dotted line or solid line, or displaying of an indicator indicating summary information, and the like. In addition, the electronic apparatus 100 may display quotation information on the summary information 50. That is, the electronic apparatus 100 may display a source of the summary information 50 together with the document 10.

In addition, when a user command for requesting an additional search for at least one word of the summary information 50 is received, the electronic apparatus 100 may perform an additional search. At this time, the electronic apparatus 100 may perform an additional search based on the document used to generate the summary information, but this is merely an example, and an additional search for at least one word may be performed through a separate server.

According to various embodiments, the electronic apparatus 100 may use at least one selected document as input data for the AI learning model to obtain the summary information.

The AI learning model learned in the present disclosure may be constructed in consideration of the application field of the recognition model or the computer performance of the apparatus. For example, the learned AI learning model may be set to acquire summary information of a document using a document containing a plurality of texts as input data. In order to generate the summary information by grasping the relation of the words included in the document rather than generating the summary information by extracting only the words included in the document, the learned AI learning model may be a model based on, for example, a neural network. The AI learning model may be designed to mimic the cognitive abilities of a human on the computer and include a plurality of network nodes that mimic neurons of a human neural network and are assigned weights. The plurality of network nodes may form each connection relation so that neurons mimic synaptic activities of neurons that send and receive a signal through synapse. In addition, the document summary model may include, for example, a neural network model or a deep learning model developed from a neural network model. In the deep learning model, a plurality of network nodes are located at different depths (or layers), and data may be exchanged according to a convolution connection relationship. Examples of document summary models include, but are not limited to, Deep Neural Network (DNN), Recurrent Neural Network (RNN), and Bidirectional Recurrent Deep Neural Network (BRDNN).

In addition, the electronic apparatus 100 may use an artificial intelligence agent to generate summary information on the document selected by the user as described above. At this time, the artificial intelligence agent is a dedicated program for providing an artificial intelligence (AI)-based service (for example, speech recognition service, secretarial service, translation service, search service, etc.) that can be executed by the existing general use processor (for example, CPU) or a separate AI-specific processor (e.g., graphics processing unit, other dedicated processor, etc.). In particular, an artificial intelligence agent can control various modules.

Specifically, if a user input for a document summary is received, the AI agent may operate. The AI agent may acquire the text included in the document based on the user input, and may obtain the summary information through the AI learning model.

If a user input for a document summary (e.g., a command to select a document and drag it to a point) is received, the AI agent may operate. Alternatively, the artificial intelligence agent may be executing before user input for document summary is received. In this case, after the user input for the document summary is received, the AI agent of the electronic apparatus 100 may obtain summary information for the selected document. In addition, the artificial intelligence agent may be in a standby state before user input for document summary is received. Here, the standby state is a state in which a predefined user input is received to control the start of operation of the AI agent. If a user input for a document summary is received while the artificial intelligence agent is in the standby state, the electronic apparatus 100 may activate the artificial intelligence agent and obtain summary information about the selected document.

The specific examples to obtain summary information relating to a selected document will be described through various embodiments.

Figure 2A:
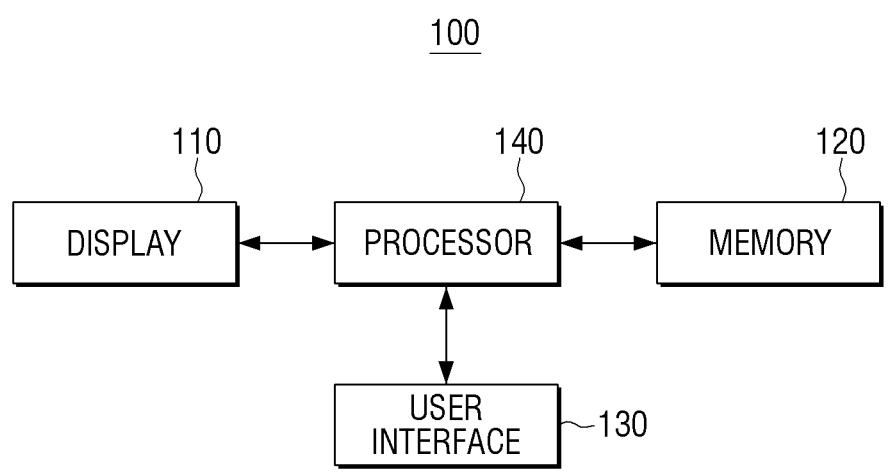
FIG. 2A is a block diagram illustrating an electronic device according to an embodiment.

FIG. 2A is a block diagram illustrating an electronic device according to an embodiment.

As illustrated in FIG. 2A, the electronic apparatus 100 includes a display 110, a memory 120, a user interface 130, and a processor 140. Other components may additionally be included in the electronic apparatus 100 as will be understood by the those of ordinary skill.

The display 110 may visually provide various screens. In particular, the display 110 may display a search screen including a document or search result containing a plurality of texts. In addition, the display 110 may also display summary information summarizing the document along with the document. In addition, the display 110 may display summary information summarizing the second document in the first document.

The memory 120 may store computer-readable instructions or data related to at least one other component of the electronic apparatus 100. In particular, the memory 120 may be implemented as a non-volatile memory, a volatile memory, a flash memory, a hard disk drive (HDD), or a solid state drive (SSD). The memory 120 is accessed by the processor 140 and read/write/modify/delete/update of data by the processor 140 can be performed. In the present disclosure, the memory may include the memory 120, ROM in the processor 140, RAM (not shown), or a memory card (for example, a micro SD card, and a memory stick) mounted to the electronic apparatus 100. In addition, the memory 120 may store computer-readable programs and data for configuring various screens to be displayed in the display area of the display 110.

In addition, the memory 120 may store the artificial intelligence agent for generating summary information, and store the AI learning model (that is, a document summary model) according to an embodiment. According to another embodiment, the AI learning model may be stored in another electronic apparatus.

Figure 2B:
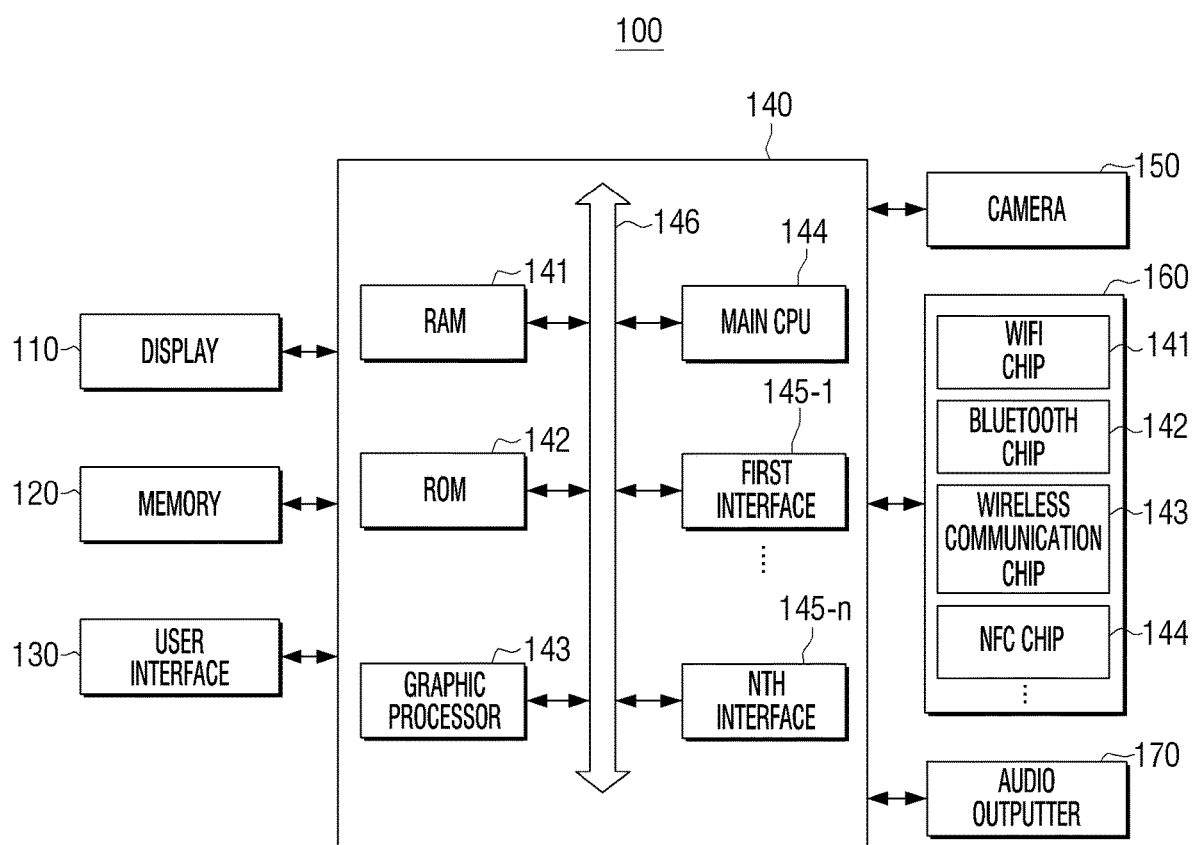
FIG. 2B is a block diagram illustrating a configuration of an electronic device according to an embodiment.
Figure 2C:
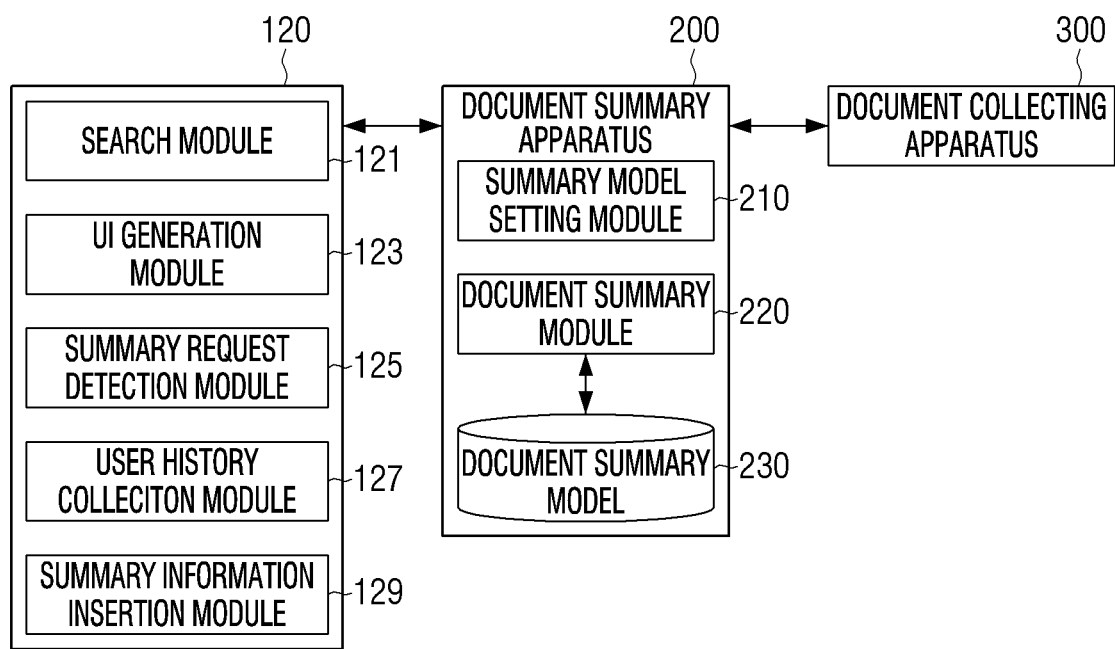
FIG. 2C is a block diagram of an electronic device according to an embodiment.

The memory 120 may store at least a part of the various modules as described in FIG. 2C.

The user interface 130 may receive various user inputs and transmit signals corresponding thereto to the processor 140. In particular, the user interface 130 may include a touch sensor, a (digital) pen sensor, a pressure sensor, a mouse, a keyboard, or a key. The touch sensor can be, for example, at least one of an electrostatic type, a pressure sensitive type, an infrared type, and an ultrasonic type. The (digital) pen sensor may be, for example, a part of a touch panel or may include a separate recognition sheet. The key may include, for example, a physical button, an optical key, or a keypad.

In particular, the user interface 130 may obtain an input signal according to a user input to select a document to generate summary information or a user input to select a document after pressing a specific button (for example, a button to execute an artificial intelligence service). The user interface 130 may transmit an signal corresponding to the user input to the processor 140.

The processor 140 may be electrically connected to the display 110, the memory 120 and the user interface 130, for example via one or more buses, to control the overall operation and functions of the electronic apparatus 100. In particular, the processor 140 may perform operations to generate summary information for a searched document using various modules and data stored in the memory 120, and the like. In particular, when a user command for requesting a search for an input keyword is received via user interface 130, the processor 140 may control to search for a plurality of documents based on the keyword and to provide a plurality of documents as a result of the search, and output such results to the display 110. When a user input to select at least one of a plurality of documents is input, the processor 140 may input a selected document to the AI learning model to acquire summary information of the document and control the display 110 to provide the summary information.

FIG. 2B is a block diagram illustrating a configuration of an electronic device according to an embodiment.

As illustrated in FIG. 2B, the electronic apparatus 100 may include the display 110, the memory 120, the user interface 130, the processor 140, a camera 150, a communicator 160, and an audio outputter 170. The display 110, the memory 120, and the user interface 130 have been described with reference to FIG. 2B, and a duplicate description is omitted.

The camera 150 may capture an image including a user. At this time, the camera 150 may be provided on at least one of the front and back of the electronic apparatus 100. Meanwhile, the camera 150 may be provided inside the electronic apparatus 100, but may be present only outside the electronic apparatus 100, and may be connected to the electronic apparatus 100 by wire or wirelessly. In particular, the camera 150 may capture an image containing the user to obtain user history information.

The communicator 160 can perform communication with various types of external devices according to various types of communication methods. The communicator 160 may include at least one of a Wi-Fi chip 161, a Bluetooth chip 162, a wireless communication chip 163, and an NFC chip 164. The processor 140 can communicate with an external server or various external devices using the communicator 160.

In particular, the communicator 160 may communicate with an external search server, an external document summary apparatus or an external cloud server.

The audio outputter 170 is a configuration to output various audio data processed as decoding, amplification, and noise filtering, and various notification sounds or a voice message. In particular, the audio outputter 170 may be configured as a speaker, but may be implemented as an output terminal for outputting audio data.

The processor 140 (or controller) may control overall operations of the electronic apparatus 100 using various programs stored in the memory 120.

The processor 140 may include a RAM 141, a ROM 142, a graphics processing unit 143, a main CPU 144, first to $n^{th}$ interfaces 145-1 to 145-$n$, and a bus 146. At this time, the RAM 141, the ROM 142, the graphics processing unit 143, the main CPU 144, the first to n interfaces 145-1 to 145-$n$, etc. may be connected to each other via the bus 146.

FIG. 2C is a block diagram of an electronic device according to an embodiment.

The electronic apparatus 100 may include a search module 121, a UI generation module, a summary request detection module 125, a user history collection module 127, and a summary information insertion module 129, and the document summary apparatus 200 may include a summary model setting module 210, a document summary module 220, and a document summary model 230.

The search module 121 may obtain an input signal according to a user input for inputting a keyword through the user interface 130. At this time, the search module 121 can obtain a keyword input into the search window based on the input signal. The search module 121 may obtain an input signal according to a user input requesting a search for an input keyword.

The search module 121 can perform a search operation based on the inputted keyword. In one embodiment, the search module 121 may search for documents stored in the electronic apparatus 100 based on the keywords. Specifically, the search module 121 can preferentially search for a document having a title including the input keyword, and search for a document having a text including the input keyword.

In another embodiment, the search module 121 may generate a query or request that includes a keyword and send the query or request to an external search server. When the external search server performs the search operation based on the query or request, the search module 121 may receive the search result from the external search server and provide the search result to the user.

The UI generation module 123 may control the display 110 to provide a search result retrieved by the search module 121. In particular, the UI generation module 123 may provide search results indicating a plurality of retrieved documents to one area of the display screen. At this time, the search module 121 may preferentially display the search result of a document including a keyword in a title or a document including a large number of keywords.

The UI generation module 123 may display a summary setting UI for setting summary information. The summary setting UI may be a UI for setting tone or length of summary information.

The UI generation module 123 may also control the display 110 to provide the summary information obtained by the document summary apparatus 200 to the user. At this time, the UI generation module 123 may control the display 110 to insert the summary information into another document according to a user command, and may control the display 11 to display the summary information using a pop-up screen or the like.

The summary request detection module 125 may obtain an input signal according to a user input for summarizing at least one document among a plurality of retrieved documents. At this time, the user input for summarizing the at least one document may be a user input for selecting at least one document and dragging the at least one document to another document. The user input may be a user input to select a summary icon for at least one document and a user input for pressing a specific button (a button for executing an artificial intelligence agent) included in the electronic apparatus 100 after selecting at least one document, and a user input for selecting an icon for summary, but is not limited thereto.

The summary request detection module 125 may transmit information on a selected document to the document summary apparatus 200 according to an input signal. At this time, the summary request detection module 125 may transmit the data about the document to the document summary apparatus 200, and the additional information regarding a document (for example, address information, etc.) can be transmitted to the document summary apparatus 200.

In addition, the summary request detection module 125 may transmit information regarding a document that is selected by a user and also summary setting information through the summary setting UI, information on a keyword, and use history information that is obtained through a user history collection module 127, together.

The user history collection module 127 may collect user history information from the electronic apparatus 100. At this time, the user history collection module 127 may collect user profile information registered by the user and use history information collected while the user uses the electronic apparatus 100.

At this time, the user profile information is information that is pre-registered to the electronic apparatus 100, including at least one of the user's name, gender, ID, preference category, biometric information (for example, key, weight, and medical history). The use history information is information collected from the user using the electronic apparatus 100, and may include a user's preference field, a user's political tendency, a user's level of knowledge, and the like. Specifically, the user history collection module 127 searches the user's preference field, the user's political orientation, the user's knowledge level, and the like based on a frequently visited web site, a keyword to be searched by a user.

A summary information providing module 129 may provide the summary information obtained from the document summary apparatus 200 to a user through the display 110. In particular, the summary information providing module 129 may insert the summary information acquired according to user input into another document. At this time, the summary information inserted in another document can be displayed to be distinguished from the text included in another document. In addition, the summary information providing module 129 may display the summary information obtained from the document summary apparatus 200 on a separate pop-up screen or a separate full screen.

The summary information providing module 120 may display key, important, or highly relevant information from among the summary information to be distinguished from other information. In addition, when an additional search request for a specific word is received, the summary information providing module 129 may display information about the specific word together around context of the specific word.

The summary model setting module 210 may set the parameters of the document summary model 230 based on the summary setting information, the information on the keyword, and the user history information received by the summary request detection module 125. Specifically, the summary model setting module 210 may set the document summary model 230 to highly weigh the keyword or a word associated with the keyword. In addition, the summary model setting module 210 can set the document summary model 230 to set the tone or length of the summary information based on the summary setting information or the user history information.

Also, when a plurality of documents are input, the summary model setting module 210 can set the document summary model 230 to highly weigh words common among a plurality of documents. In addition, the summary model setting module 210 may set the document summary model 230 to highly weigh a word or a sentence included in the summary or the conclusion part of the table of contents.

The document summary module 220 may use the document summary model 230 to perform summary operations on documents selected by the user to generate summary information. The document summary module 220 can recognize the document component and extract the key element using the frequency of the word in the summary document, the title, the length of the sentence, and the location of the sentence. The document summary module 220 may then calculate the weight for each sentence or word and determine the priority for the sentence or word. The document summary module 220 can extract key words based on the priority of the words included in the document and the relationship of the words. The document summary module 220 may then generate summary information through natural language processing (NLP) based on the key words. However, the document summarizing method as described above is merely an embodiment, and the summary information can be generated using various document summarizing methods.

The document summary module 220 can summarize the document by using the documents collected by the document collection device 300. Specifically, the document summary module 220 can receive the document related to the document to be summarized to the document collecting apparatus 300, and obtain the summary information using the received related document and the document selected by the user. Then, the document summary module 220 extracts words common to the documents selected by the user and the documents received by the document collection device 300, and obtains summary information using the extracted common words. For example, if a document selected by a user is an article, the document summary module 220 may obtain a newspaper article associated with the selected article via the document collection device 300, and obtain summary information about articles selected by the user.

Meanwhile, the document summary module 220 can summarize the document in various manners in consideration of the performance of the document summary apparatus 200 and the like. Specifically, the document summary module 220 extracts an extraction summary that directly extracts words, phrases, and sentences existing in the document, and an abstract summary that creates a new document by compressing the contents of the sentence can be used to obtain summary information. The document summary module 220 may also include one of a generic summary that summarizes the views of the document author, regardless of user information, and a query-based summary that summarizes the document based on user history information.

The document summary model 230 may be an artificial intelligence learning model to obtain summary information about a document. At this time, the document summary model 230 can learn to recognize words representing constituent elements including a document, extract key words, and learn to extract key words based on the relationship with words, and learn to generate summary information by the nature of the summary acquired from the training data.

As described above, the document summary apparatus 200 and the document collection device 300 may be implemented as a server external to the electronic apparatus as a separate device, but may be embedded in the electronic apparatus 100.

FIGS. 3, 4, 5, and 6 are flowcharts illustrating methods of providing summary information according to various embodiments.

Figure 3:
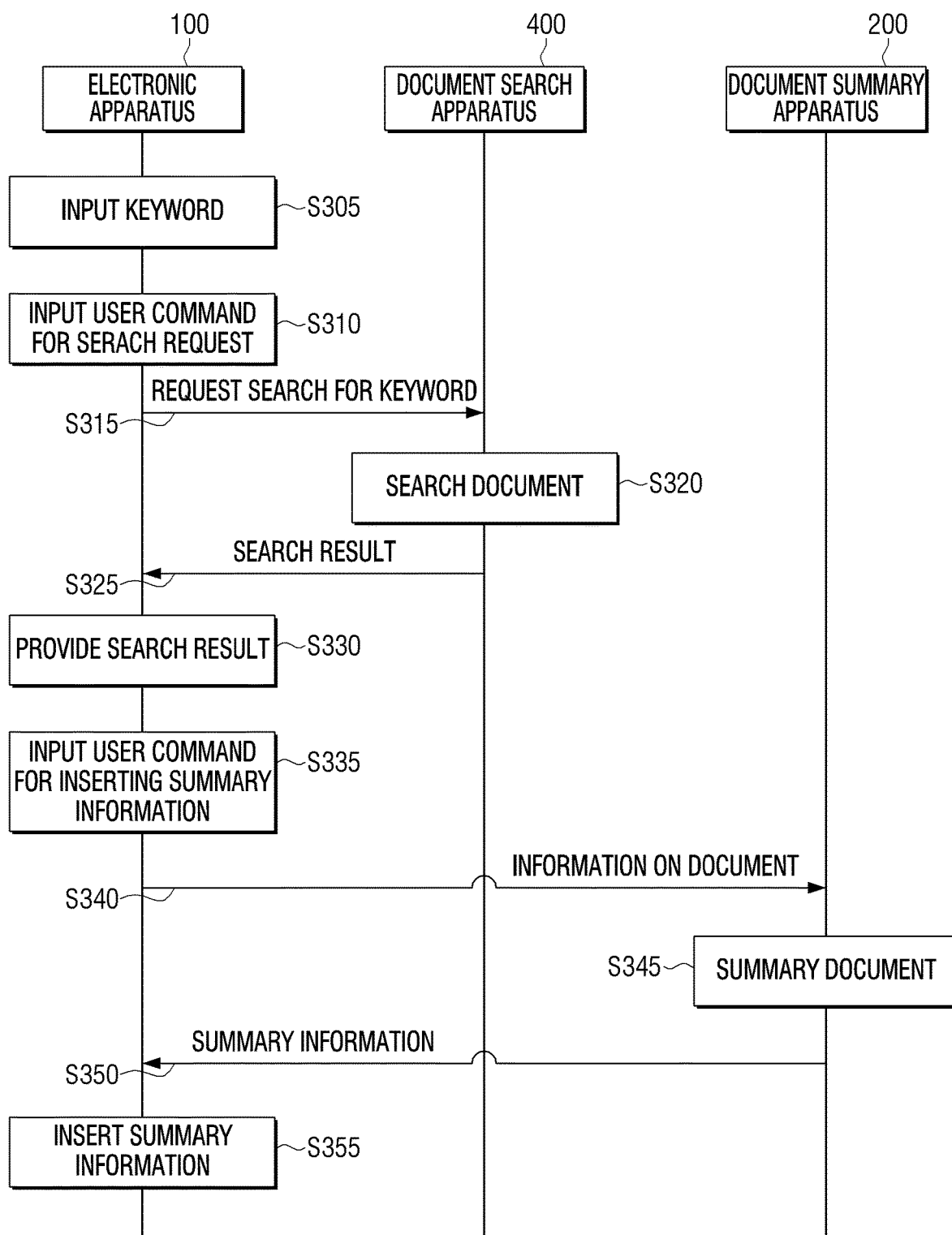
FIGS. 3, 4, 5, and 6 are flowcharts illustrating methods of providing summary information according to various embodiments.

FIG. 3 is a flowchart to describe a method of inserting summary information into a document according to an embodiment.

The electronic apparatus 100 may receive a keyword in step S305. At this time, the electronic apparatus 100 may receive a keyword through a search window while displaying a first document.

The electronic apparatus 10 may receive a user command regarding a request for search of the input keyword in step S310. For example, the electronic apparatus 100 may receive a user command to select an icon for searching after a keyword is input.

The electronic apparatus 100 may transmit a request to search for documents based on the keyword to a document search apparatus 400 in step S315. At this time, the search request may include information on the keyword.

The document search apparatus 400 can search for a document based on a keyword in step S320. At this time, the document search apparatus 400 may be implemented as an external server separate from the electronic apparatus 100, but may be provided in the electronic apparatus 100. In particular, the document search device apparatus 400 can search a plurality of documents including a keyword or based on the keyword.

A document search apparatus 400 may transmit a search result based on a keyword to the electronic apparatus 100 in step S325.

The electronic apparatus 100 may provide a search result in step S330. At this time, the electronic apparatus 100 may provide a search result to a second area of a display screen while the first document is being provided to a first area of a display screen.

The electronic apparatus 100 may receive a user command for inserting summary information in step S335. At this time, the electronic apparatus 100 may receive a user command to select at least one of a plurality of documents included in the search result and then drag the document to one point of the first document.

The electronic apparatus 100 may transmit information about a document for generating summary information to the document summary apparatus 200 in step S340. At this time, the electronic apparatus 100 can transmit the information on the document but also summary setting information, information on the keyword, and user history information together.

The document summary apparatus 200 may generate summary information by summarizing the document in step S345. At this time, the document summary apparatus 200 can obtain summary information by inputting information about the document as input data into the document summary model. In particular, the document summary apparatus 200 can generate summary information based on information on a keyword, user history information as well as information on a document. In addition, when the tone or the length of the summary information is set by a user, the document summary apparatus 300 can generate the summary information based on the length or the tone of the summary information set by the user.

The document summary apparatus 200 may transmit the obtained summary information to the electronic apparatus 100 in step S350.

The electronic apparatus 100 may insert the summary information into another document in step S355. Specifically, the electronic apparatus 100 may insert the summary information at the point at which the user command is entered, wherein the summary information may be displayed differently from other texts. In addition, the electronic apparatus 100 may insert citation information for the summary information together.

Figure 4:
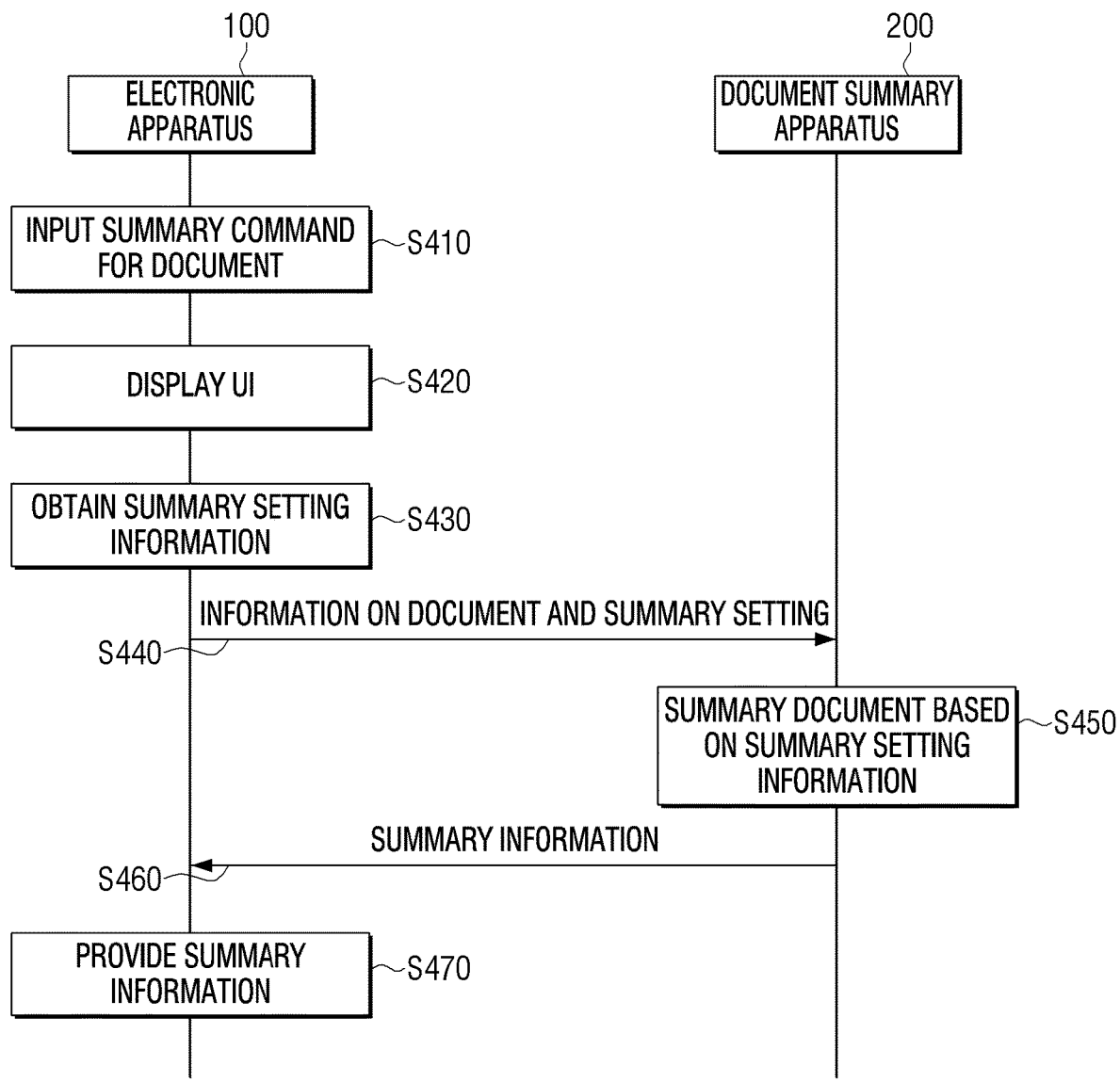

FIG. 4 is a flowchart to describe a method of generating summary information based on summary setting information that is generated through a UI, according to an embodiment.

First, the electronic apparatus 100 can receive a summary command for a document in step S410. Specifically, the electronic apparatus 100 may receive a user command to select a summary icon displayed in one area of the document. Alternatively, the electronic apparatus 100 may receive a user touch command of a predetermined pattern in the document. Alternatively, the electronic apparatus 100 may receive a user command for selecting a summary icon that is created after a predetermined button (e.g., a button for executing an AI agent) included in the electronic apparatus 100 is selected.

The electronic apparatus 100 may display a UI for the summary setting in step S420. In this case, the UI for the summary setting may be a UI for setting the tone or the length of the summary information, but is not limited thereto. In addition, the UI for the summary setting may be in the form of a scroll bar, but is not limited thereto and may be in the form of a menu including a plurality of icons.

The electronic apparatus 100 may acquire summary setting information according to a user command input through the UI in step S430. At this time, the summary setting information may be information about the tone or length of the summary information. For example, the summary setting information may include information on whether the summary information is negative or positive, and whether the summary information is long or short.

The electronic apparatus 100 may transmit information on the obtained document and summary setting information to the document summary apparatus 200 in step S440.

The document summary apparatus 200 may summarize a document based on the summary setting information in step S450. In particular, the document summary apparatus 200 may generate summary information based on the tone or length that is set by the summary setting information.

For example, if the document is an article and the tone of the summary information is set to be negative, the document summary apparatus 200 may generate summary information based on negative words among the words included in the article. Also, if the document is an article and the tone of the summary information is set to be positive, the document summary apparatus 200 can generate summary information based on the positive words among the words contained in the article.

As another example, if the document is an article and the length of the summary information is set as short, the document summary apparatus 200 acquires the conclusion part of the article based on the relationship between the location and the title of the sentence, and generate summary information based on basic background such as date, place, event, and the like. If the document is for event delivery and the length of the summary information is set to medium, the document summary apparatus 200 can generate summary information for conveying an event centering on who, what, where, when, why, and how (Five Ws and 1H: 5W1H). When the document is an article dealing with conflict of opinions and the length of the summary information is set to medium, the document summary apparatus 200 can generate summary information based on the position of the key subject of the article. If the document is an article about providing results of a sport and the length of the summary information is set to medium, the document summary apparatus 200 can generate summary information based on the content of the results of the sport. In addition, when the document is for event delivery and the length of the summary information is set to be long, the document summary apparatus 200 can generate summary information including additional content along with 5W1H. If the document is about conflict of opinions, and the length of the summary information is set to be long, the document summary apparatus 200 can generate summary information based on the position of all subjects having a disagreement. If the document is an article about providing a result of sports and the length of the summary information is set long, the document summary apparatus 200 can generate summary information based on the content of the highlight scene as well as the result of the sports. That is, the document summary apparatus 200 can generate the summary information in different ways based on the contents of the contents.

The document summary apparatus 200 may transmit summary information to the electronic apparatus 100 in step S460.

The electronic apparatus 200 may provide the summary information in step S470. As an example, the electronic apparatus 200 may match and provide the obtained summary information on an existing document. Specifically, the electronic apparatus 200 can generate a layer capable of displaying a marker at the location of a sentence or word corresponding to the summary information on the document, and can modify the script of the document (e.g., a web document) In addition, a separate document image in which the marker is displayed in the summary information part can be generated. As another example, the electronic apparatus 200 may display summary information on a screen (e.g., full screen or pop-up screen) separate from the document. As another example, the summary information may be generated as a separate file and stored in the electronic apparatus 100 or stored in an external cloud server.

Alternatively, the electronic apparatus 200 may provide a link of a document corresponding to summary information along with the summary information, and provide a link for confirmation of details on the short summary part out of the summary information within the summary information.

As described above, by summarizing a document based on summary setting information that is set through a UI, summary information that suits the needs of a user may be provided to a user.

Figure 5:
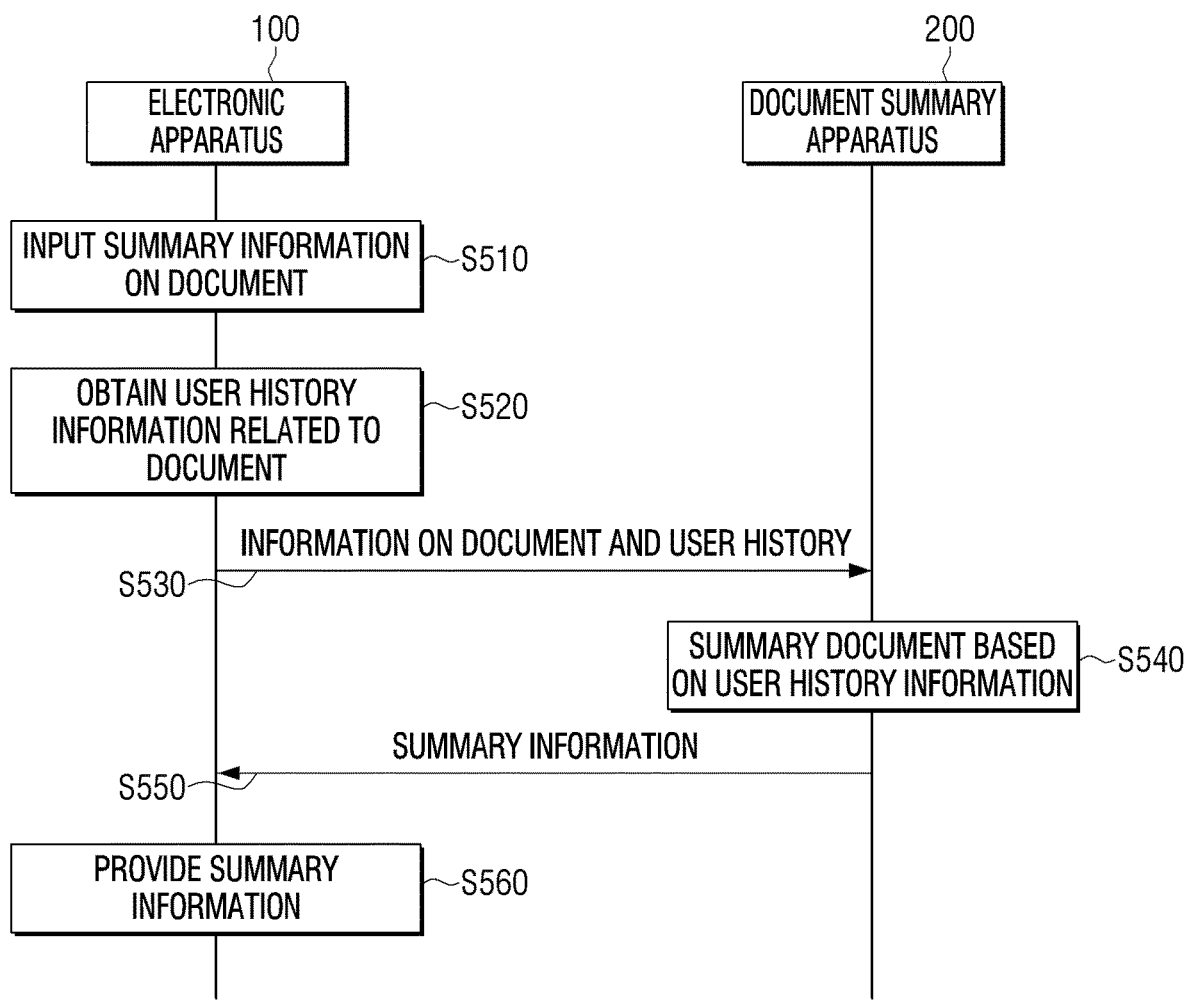

FIG. 5 is a flowchart to describe a method of summarizing a document based on user history information according to an embodiment.

First, the electronic apparatus 100 may receive a command for summary of a document in step S510. To be specific, the electronic apparatus 100 may receive a user command to select a summary icon displayed on an area of a document.

The electronic apparatus 100 may obtain user history information related to the document in step S520. At this time, the user history information may include user profile information registered by the user, user use history information, document access path information, and the like.

The electronic apparatus 100 may transmit information on a document and user history to the document summary apparatus 200 in step S530.

The document summary apparatus 200 may summarize the document based on the user history information in step S540. As an example, the document summary apparatus 200 may generate summarized information by summarizing the document based on the knowledge level of a user. Specifically, when the search history or the document check history related to the document to be summarized is large based on the use history information of the user, the document summary apparatus 200 may briefly summarize the basic contents of the document and generate summary information. As another example, the document summary apparatus 200 can generate summary information by determining the degree of interest in a document based on user profile information (for example, age, gender, etc.). Specifically, if the degree of interest in the document is high based on the user profile information, the document summary apparatus 200 can generate summary information to shorten the basic contents and summarize the detailed contents in a long time, and the document summary apparatus 200 can generate the summary information to summarize the basic contents to be long. As another example, the document summary apparatus 200 may generate the summary information by determining the user's current interest level based on the access path of the document. Specifically, when the document is accessed by chance during web browsing, the document summary apparatus 200 may generate summary information such that the degree of interest in the document is low and the basic content is summarized to be long. If the document is accessed during the verification of the related documents, the document summary apparatus 200 may determine that the interest of the document is high, so that the summary information can be shortly summarized and the new contents summarized to be long. When the document is accessed through keyword search, the document summary apparatus 200 can generate summarized information by summarizing the document based on keywords.

In addition, the document summary apparatus 200 can generate summary information in different ways depending on the type of article. Specifically, when the document to be summarized is an event-based article, the document summary apparatus 200 can generate summary information about the event (5W1H). When the document to be summarized is an article including conflict of opinions, the document summary apparatus 200 can generate summary information based on conflicting opinions. If the document to summarize is an article for delivery of a result (of a sport), the document summary apparatus 200 may generate summary information centering on the result portion. In addition, if there is information about a user-preferred sentence style (e.g., a short sentence), the document summary apparatus 200 can generate summary information based on the user's preferred sentence style, and if there is no information about the preferred sentence style, the document summary apparatus 200 can generate summary information based on the sentence style of the document. In addition, the document summary apparatus 200 can generate summary information based on the tone (positive/negative or progress/conservative) of the document.

The document summary apparatus 200 may transmit summary information to the electronic apparatus 100 in step S550.

The electronic apparatus may provide the transmitted summary information in step S560.

Figure 6:
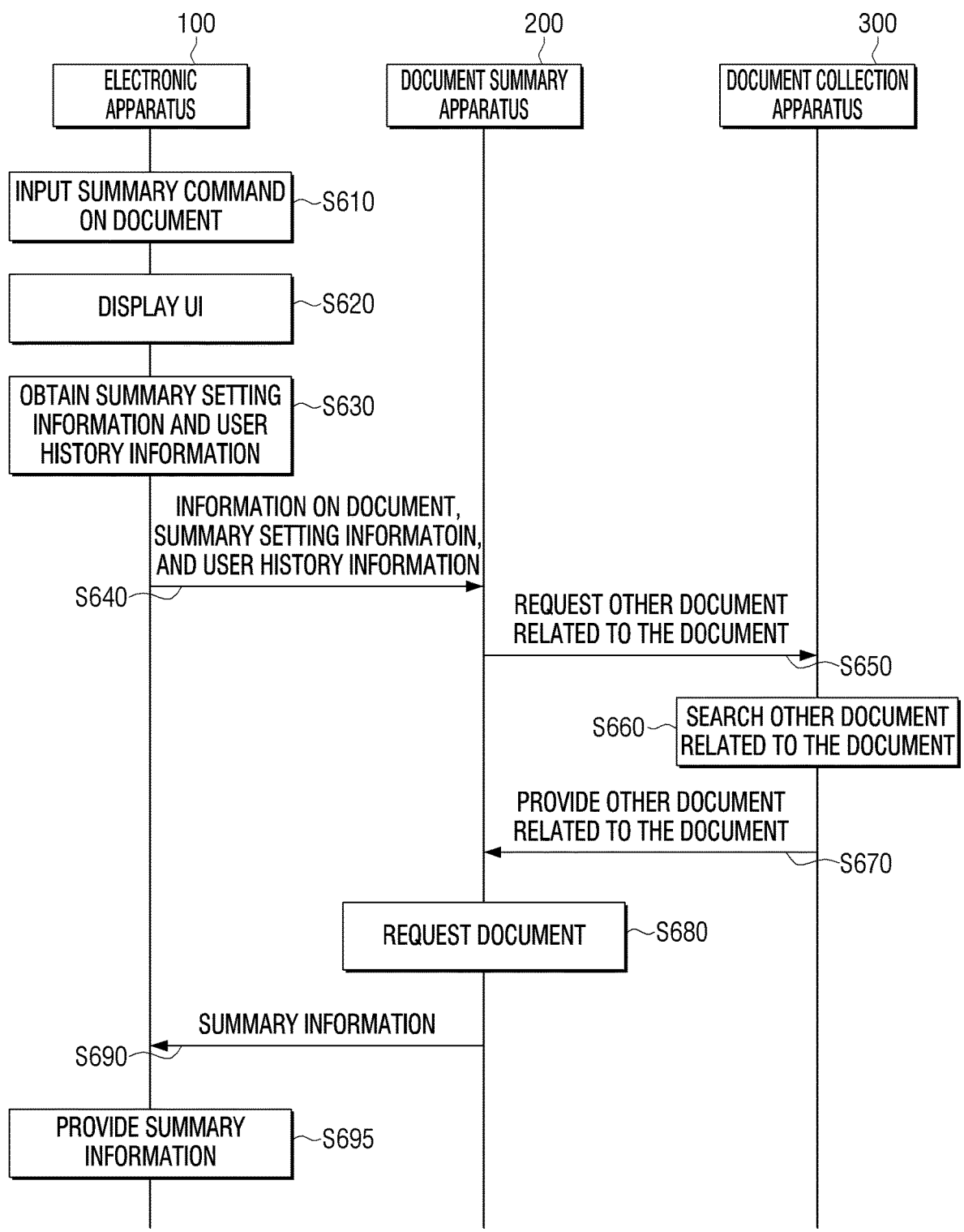

FIG. 6 is a flowchart of a method of generating summary information using a related document that is collected through a document collecting device.

The electronic apparatus 100 may receive a command for summarizing a document in step S610. To be specific, the electronic apparatus 100 may receive a user command to select a summary icon displayed on a portion of a document.

The electronic apparatus 100 may display a UI for summary setting in step S620. At this time, the UI for summary setting may be a UI for setting a tone or length of summary information, but is not limited thereto.

The electronic apparatus 100 may obtain the summary setting information and the user history information in step S630. Specifically, the electronic apparatus 100 can acquire the summary setting information via the UI and obtain user history information including user profile information and user's usage history information.

The electronic apparatus 100 may transmit information on a document, summary setting information, and user history information to the document summary apparatus 200 in step S640.

The document summary apparatus 200 may request another document related to the document based on the information about the document in the document collecting apparatus 300 (S650). Here, the other document related to the document may be a document having the same key word as the key keyword of the document, a document having the same subject as the document, a document generated by the document creator, a document created within a predetermined period of time from the time the document is created, but are not limited thereto.

The document collecting apparatus 300 may search for another document related to the document in step S660, and may transfer the document as a result of the search to the document summary apparatus 200 in step S670.

The document summary apparatus 200 may summarize the document using other related documents based on the summary setting information and the user history information in step S680. Specifically, the document summary apparatus 200 can generate summary information based on words that appear in each of the document and other related documents. In addition, the document summary apparatus 200 can generate summary information as not verbatim in the document but as including related contents among other related documents. For example, if only the position of A is listed in the document and the position of B is not listed, the document summary apparatus 200 can generate summary information including the position of B through other related documents.

The document summary apparatus 200 may transmit summary information to the electronic apparatus 100 in step S690, and the electronic apparatus 100 may provide the obtained summary information in step S700.

Figure 7:
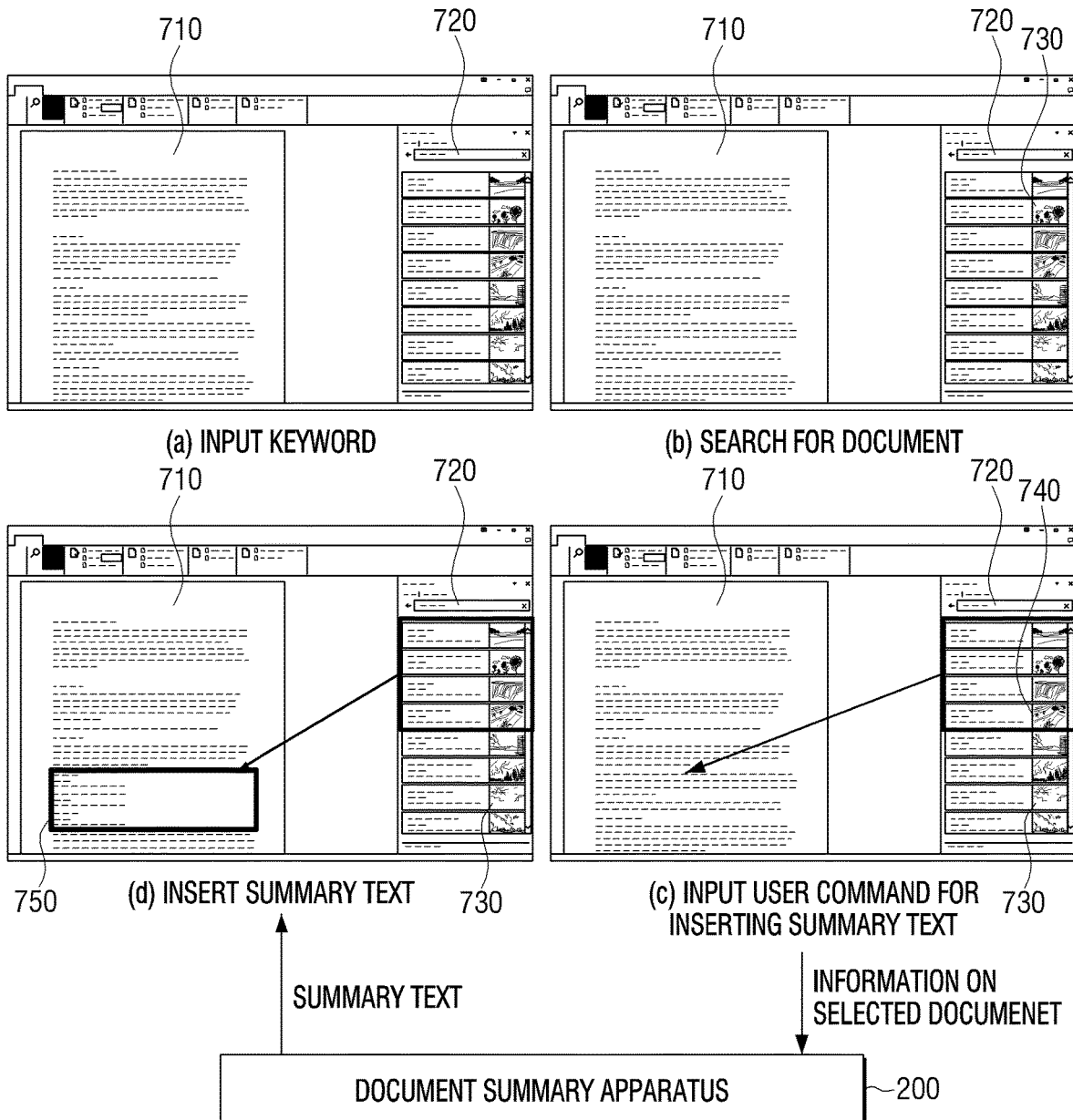
FIG. 7 is a diagram illustrating inserting a summary text according to an embodiment.

FIG. 7 is a diagram illustrating inserting a summary text according to an embodiment.

First, as shown in (a) of FIG. 7, the electronic apparatus 100 displays a first document 710 in a first area (left area) of the screen, and a search window 720 at an upper area of a second area. At this time, the electronic apparatus 100 can display an article as a document displayed in the first area. The electronic apparatus 100 may receive an input signal according to a user command for inputting a keyword in the search window 720 and may display the keyword in the search window 720 in response to the input signal.

When a search request for a keyword is received, the electronic apparatus 100 requests the document search apparatus 400 to search for a plurality of documents related to the keyword, searches for a plurality of documents from the document search apparatus 400, and receives the search result from the document search apparatus 400 indicating a plurality of documents. At this time, the electronic apparatus 100 can display the list 730 including a plurality of retrieved documents in the second area, as shown in (b) of FIG. 7. At this time, the plurality of documents included in the list can be sorted in order of priority, with respect to the documents having high relevance to the keyword. For example, the documents included in the list may be arranged in the order of documents having a title including a keyword, a document having a text containing a keyword, and a document containing words similar to a keyword.

The electronic apparatus 100 may receive at least one of the retrieved documents 740 and an input signal according to a user input for inserting into the first document 710 displayed in the first area. Specifically, the electronic apparatus 100 selects three documents 740 among a plurality of documents included in the list 730, as shown in (c) of FIG. 7 and receive an input signal according to a user input to drag the selected document to a point of the first document 710.

The electronic apparatus 100 may send information about the selected document 740 to the document summary apparatus 200 according to a user command to insert the summary text into the first document 710. At this time, the electronic apparatus 100 can transmit the information about the document 740 but also information about a keyword, summary setting information for summarizing the document, user history information, and the like. Since a method of summarizing a document using information on a keyword, summary setting information for summarizing a document, user history information, and the like has been described above, a detailed description will be omitted.

The document summary apparatus 200 may generate summary text based on information about the selected document 740. At this time, the document summary apparatus 200 can obtain the summary text by inputting the selected document as input data into the learned document summary model. At this time, the document summary apparatus 200 can acquire the summary text using the selected document as well as other documents related to the selected document.

As illustrated in (c) of FIG. 7, when a plurality of documents are selected as documents to be summarized, the document summary apparatus 200 may generate a summary text based on words or sentences commonly present in the plurality of selected documents. That is, the document summary apparatus 200 may set a high weight to words or sentences which are commonly included in the plurality of selected documents and generate a summary text.

The document summary apparatus 200 may transmit the generated summary text to the electronic apparatus 100.

The electronic apparatus 100 inserts the received summary text 750 into the first document 710 displayed in the first area at the point at which the user command is input, as shown in (d) of FIG. 7. At this time, the electronic apparatus 100 may display the summary text 750 to be distinguished from other text, and may display citation information (i.e., source information) together in the summary text.

As a result, the user can create a dissertation more efficiently by summarizing the document acquired through the search result at the time of creating the paper and inserting the summary information into the paper to draft the paper more efficiently.

Figure 8:
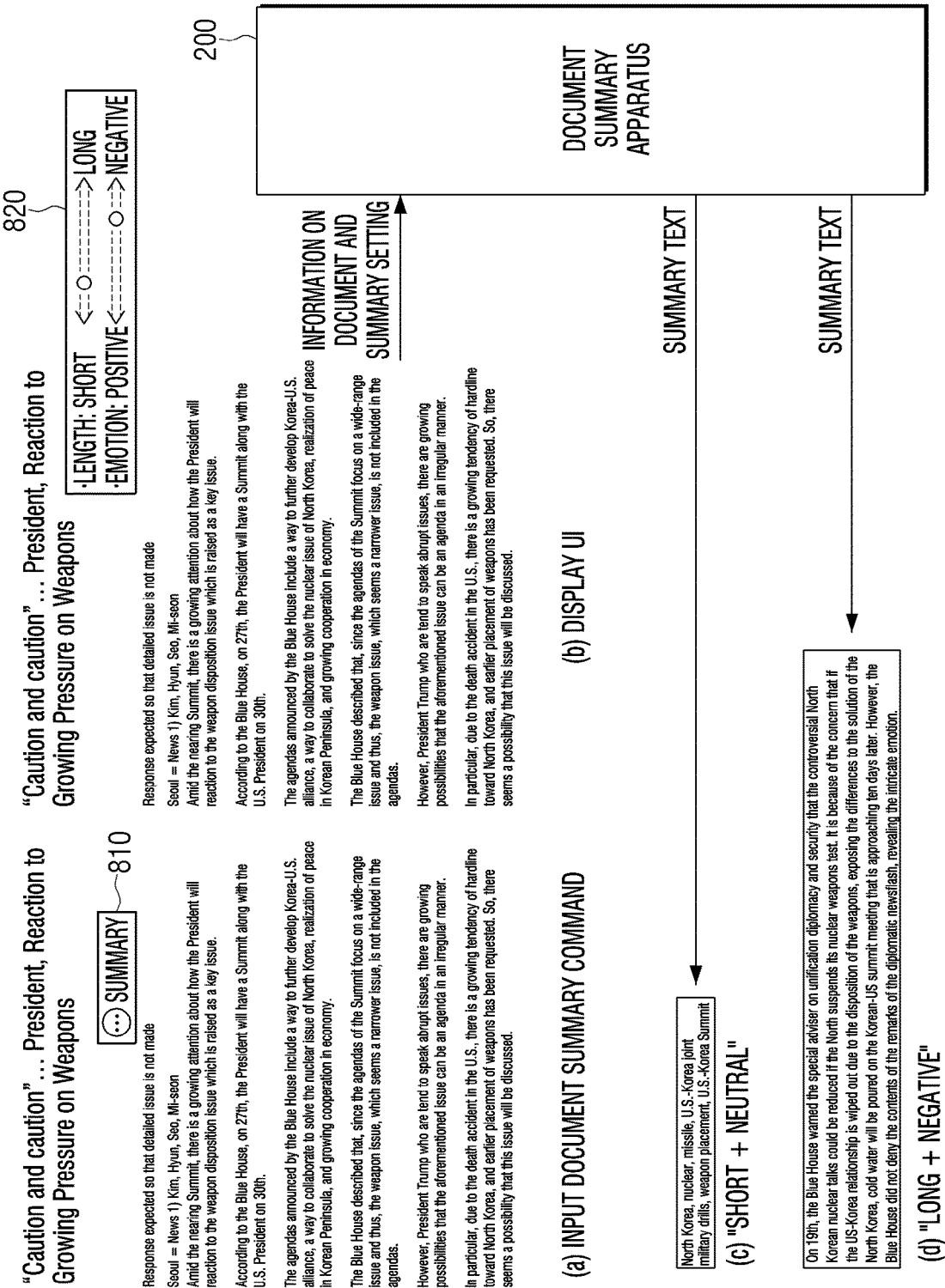
FIG. 8 is a diagram illustrating setting a length and tone of a summary text according to an embodiment.

FIG. 8 is a diagram illustrating setting a length and tone of a summary text according to an embodiment.

First, the electronic apparatus 100 can display an article including a plurality of texts, as shown in (a) of FIG. 8. At this time, a summary icon 810 for receiving a document summary command may be displayed around the title in the article. At this time, the summary icon 810 may be displayed at the same time when the electronic apparatus 100 displays an article, but this is only an example. The summary icon 810 may be displayed after a predetermined button (for example, a button for running an AI agent) or a user command of a predetermined pattern of the electronic apparatus 100 is input after the article is displayed. After the predetermined button or a user command of a predetermined pattern of the electronic apparatus 100 is input, the electronic apparatus 100 may constitute a separate layer including the summary icon 810 and display the same in the article.

When the user command for selecting the icon 810 (in particular, the user command for selecting the icon for the summary setting among the summary icons 810) is received, the electronic apparatus 100 may display a UI 820 for document summary settings as illustrated in (b) of FIG. 8. At this time, the electronic apparatus 100 may form a separate layer including the UI 810 for document summary setting and display UI for setting the properties of the document summary as being overlaid on the article. Meanwhile, although the UI 820 for document summary setting is displayed after the summary icon 810 is selected in the above-described embodiment, the summary icon 810 and the document summary setting UI 820 may be displayed simultaneously.

In particular, the UI 820 for document summary setting can set at least one of the length and the tone of the summary text. At this time, the UI 820 for the document summary setting may be a progress bar form 820 as shown in (b) of FIG. 8, but this is merely exemplary, and it may be a menu form including a plurality of items.

When a user command is input to the UI 820, the electronic apparatus 100 may generate summary setting information according to a user command, and transmit summary setting information to the document summary apparatus 200 along with the information on the document (article). Here, information on a document may be a text included in an article, but this is merely exemplary and can be information on a web address corresponding to an article.

The document summary apparatus 200 can generate a summary text by summarizing the document based on the received summary setting information. For example, when the length of the summary text is set to be short and the tone of the summary text is set to neutral, the document summary apparatus 200 may extract key words for delivering results among the texts included in the article, and generate summary text to include only the extracted words. That is, the document summary apparatus 200 can generate a summary text containing only result-based words as shown in (c) of FIG. 8.

As another example, when the length of the summary text is set to be long and the tone of the summary text is set to negative, the document summary apparatus 200 not only delivers the results but also extracts a keyword or a key sentence by adding a high weight to negative words, and generates a summary text using the extracted keyword or a key sentence. At this time, the document summary apparatus 200 can generate a summary text by generating a natural sentence through natural language processing of the extracted key word. That is, as shown in (d) of FIG. 8, the document summary apparatus 200 displays not only the results-oriented sentence but also the sentences of the conflicting opinions, and generates a summary text including negative comments during the opinion confrontation.

The electronic apparatus 100 may provide a summary text that is generated while the article is displayed as a separate pop-up screen, but this is merely exemplary and markers can be displayed on a portion which corresponds to the summary text from among the texts included in the article.

As described above, the document summary apparatus 200 may provide a summary text a user desires through summary setting information that is obtained through the UI 820.

Figure 9:
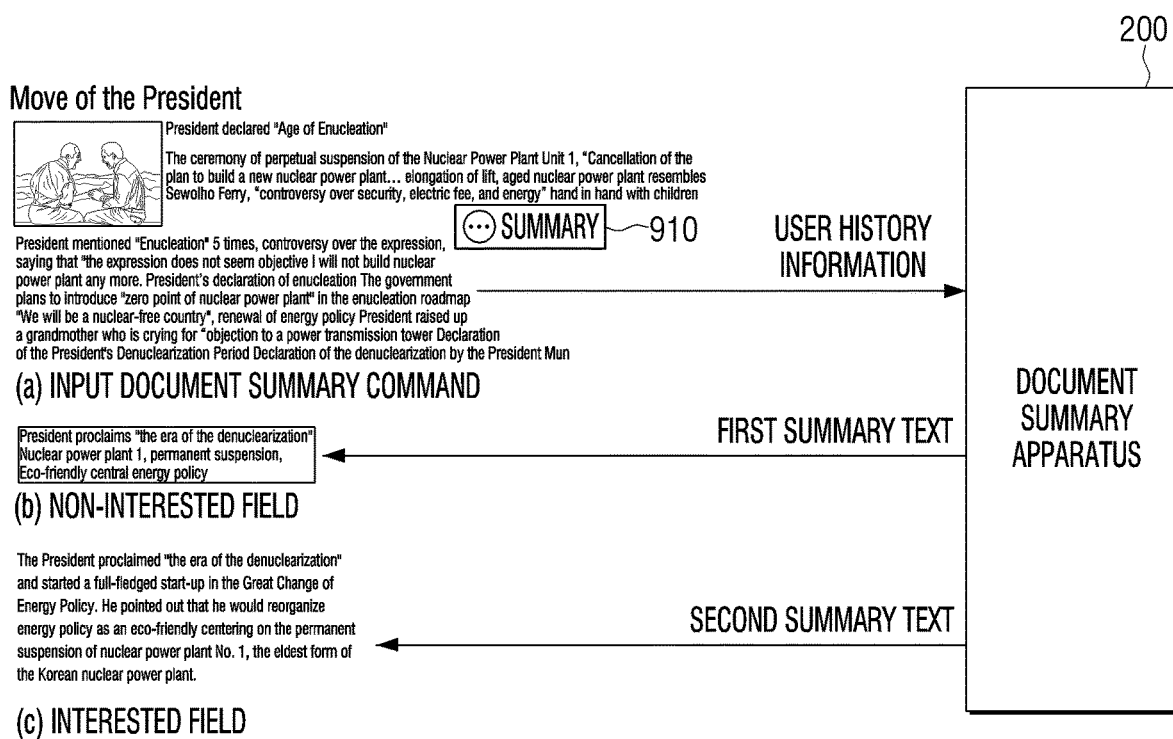
FIG. 9 is a diagram illustrating setting a length and tone of a summary text based on user history according to an embodiment.

FIG. 9 is a diagram illustrating setting a length and tone of a summary text based on user history according to an embodiment.

First, the electronic apparatus 100 can display a web page including a plurality of article links, as shown in (a) of FIG. 9. At this time, a summary icon 910 for receiving a document summary command for the representative link is displayed about the representative link (i.e., the link located at the uppermost position) among the plurality of article links, as shown in (a) of FIG. 9. The summary icon 910 may be displayed at the same time when the electronic apparatus 100 displays an article, but this is only an example, and the summary icon 910 may be displayed after the web page is displayed, (e.g., a button for executing an artificial intelligence agent) or a user command of a predetermined pattern is received.

In addition, although the summary icon 910 corresponding to the representative link is displayed in (a) of FIG. 9(*a*), this is only exemplary, and after the summary icon 910 is selected, an article link for generating a summary text can be selected. Alternatively, summary icons respectively corresponding to a plurality of links can be displayed around the plurality of links.

When the user command for selecting the summary icon 910 is received, the electronic apparatus 100 can acquire user history information corresponding to the representative link. At this time, the user history information may include user interest related to the representative link, user's expertise, and the like. The user's interest and user's expertise associated with the representative link can be determined based on profile information such as age, gender, etc. of the user, the number of searches of other articles related to the article corresponding to the representative link, or the representative link access path.

The electronic apparatus 100 may send information about the document (representative link) and user history information to the document summary apparatus 200. Here, the electronic apparatus 100 can transmit the web address of the representative link as information on the document, but this is merely exemplary, and the text of the article may be included in the representative link.

The document summary apparatus 200 can summarize the document based on the information about the document and the user history information. For example, if the article corresponding to the representative link is determined to be a non-interested field (or non-professional field) through the user history information, the document summary apparatus 200 may extract a keyword to deliver a result from among the texts included in the article corresponding to the representative link. At this time, the document summary apparatus 200 can extract key words based on easy to understand words and generate summary texts by listing the extracted key words as shown in (b) of FIG. 9. As another example, if the article corresponding to the representative link is the interested field (or the field of expertise) through the user history information, the document summary apparatus 200 can extract a keyword or a key sentence from among texts included in an article corresponding to a representative link. At this time, the document summary apparatus 200 can extract a keyword or a key sentence based on a technical term, and as shown in (c) of FIG. 9, and provide a natural sentence as a summary text by treating the extracted keyword as natural language.

Meanwhile, the electronic apparatus 100 can provide a summary text generated in a state in which a plurality of links are displayed as separate pop-up screens, but this is only an example, and an article corresponding to the representative link can be displayed, and markers can be displayed in the portion corresponding to the summary text among the text included in the article.

As described above, the document summary apparatus 200 may provide a summary text that is optimized to a user through user history information.

In this embodiment, it is described that the document summary apparatus 200 generates the summary text using the article corresponding to the representative link. However, this is merely an example, and the document summary apparatus 200 may generate a summary text using articles corresponding to the representative link and articles corresponding to other links related to the representative link.

Figure 10:
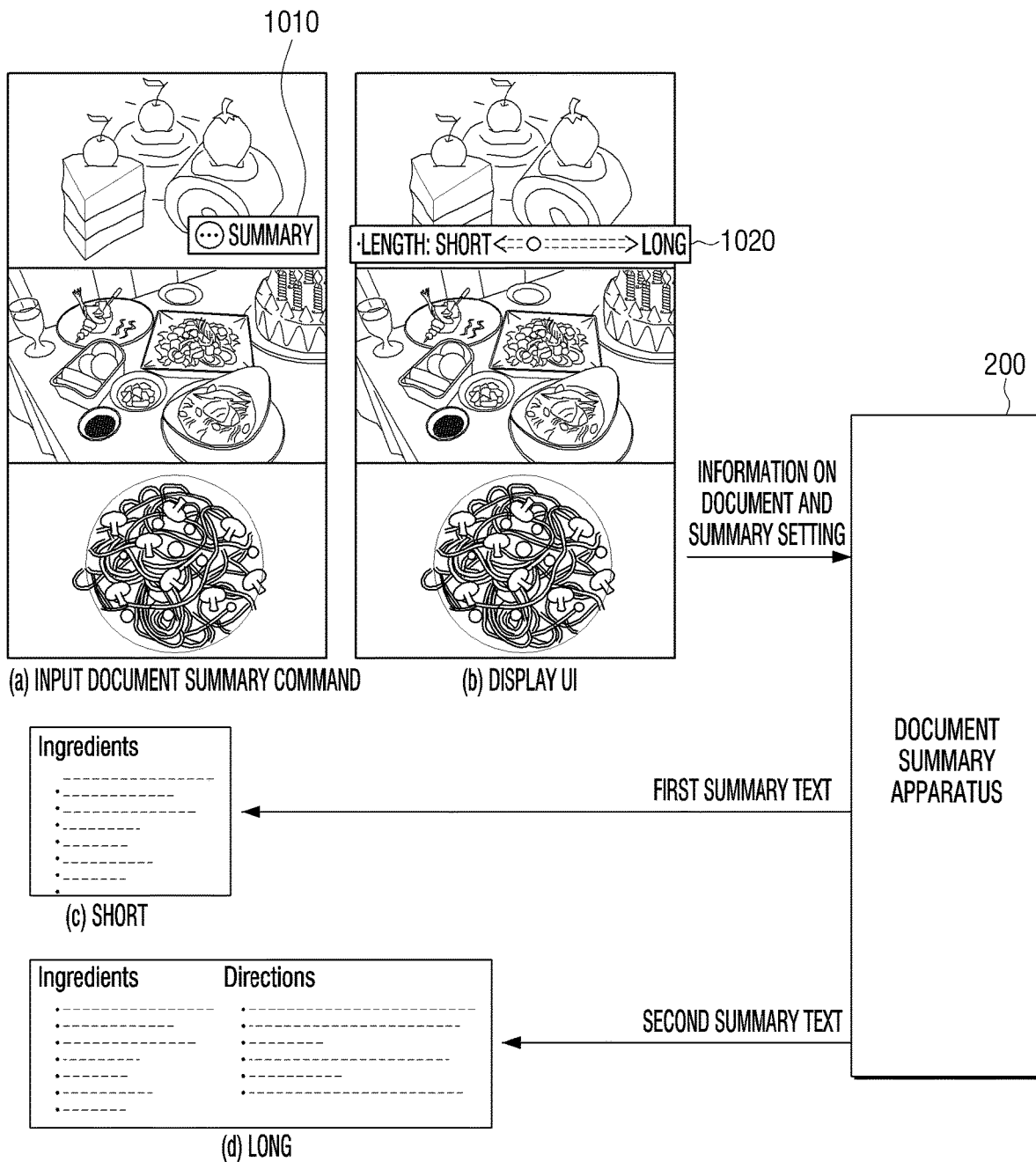
FIG. 10 is a diagram illustrating providing a summary text for summarizing a receipt document according to an embodiment.

FIG. 10 is diagram illustrating providing a summary text for summarizing a receipt document according to an embodiment.

The electronic apparatus 100 can display a link corresponding to a plurality of recipe documents. Here, the electronic apparatus 100 may display a summary icon 1010 for document summarization in one area of the link located at the top of the plurality of links. As shown in (a) of FIG. 10, the summary icon 1010 may be displayed when a link located at the uppermost position by the user is selected or when a cursor or a highlight is displayed on the link located at the uppermost position. As another example, a summary icon corresponding to each of the plurality of links may be displayed on the corresponding link.

When the user command for selecting a summary icon 1010 is input, the electronic apparatus 100 can display a UI 1020 for document summary setting, as shown in (b) of FIG. 10. At this time, the electronic apparatus 100 may constitute a separate layer including the UI 1010 for document summary setting and overlaid on the article. Although the UI 1020 for document summary setting is displayed after the summary icon 1010 is selected in the above-described embodiment, the summary icon 1010 and the document summary setting UI 1020 may be displayed simultaneously.

In particular, the UI for document summary setting 1020 can set the length of the summary text. Here, the UI 1020 for document summary setting may be in the form of a progress bar 1020 as shown in (b) of FIG. 10, but this is merely exemplary, and it may be a menu form including a plurality of items. Meanwhile, in the above-described embodiment, the UI 1020 for document summary setting can set only the length of the summary text. However, this is only an example, and it is possible to set whether to include an image or a video in the summary text.

When a user command is input to the UI 1020, the electronic apparatus 100 may generate summary setting information according to the user command, and transmit summary setting information together with information on the recipe document to the document summary apparatus 200. Here, the information about the document may be text included in the article, but and the information about the document may be information on the web address corresponding to the article.

The document summary apparatus 200 can generate a summary text by summarizing the document based on the received summary setting information. For example, if the length of the summary text is set to be short, the document summary apparatus 200 can extract the words representing the material among the texts included in the recipe article, and generate the summary text including only the extracted words. That is, the document summary apparatus 200 can generate a summary text containing only material-oriented words as shown in (c) of FIG. 10. As another example, if the length of the summary text is set to be long, the document summary apparatus 200 extracts a sentence about the recipe as well as words representing the material among the texts included in the recipe article, and displays a summary text including the material and the recipe. That is, the document summary apparatus 200 can generate a summary text that includes sentences for recipes as well as material-oriented words as shown in (d) of FIG. 10.

The document summary apparatus 200 may transmit the generated summary text to the electronic apparatus 100 and the electronic apparatus 100 may display the generated summary text on a separate full screen or pop-up screen. Alternatively, the electronic apparatus 100 may display a recipe document and display a marker in a portion corresponding to the generated summary text of the recipe document.

Meanwhile, in the above-described embodiment, the recipe document is summarized using the summary setting information set through the UI 1020. However, the recipe document can be summarized based on user history information. Specifically, when the cooking is the user's specialty, the document summary apparatus 200 can extract only the key words for the ingredients and the recipe to provide a short summary text. If the cooking is the non-specialty field, the document summary apparatus 200 can extract detailed words for the ingredients and recipes and provide a long summary text through natural language processing of the extracted words.

In the above-described embodiment, the summary text is provided using the recipe document. However, the summary text may be provided using another document. For example, when the summary text is provided using the travel related document and the short summary text is set to be generated by the user, the document summary apparatus 200 may extract a word or a phrase based on the travel course among the travel related documents to generate summary text. Alternatively, when the user selects to generate a long summary text, the document summary apparatus 200 may extract a word or a sentence containing information on a travel destination, a main sightseeing spot, and a famous restaurant, in addition to a travel course.

FIG. 11 is a diagram illustrating searching for a word included in a summary text according to an embodiment.

First, the electronic apparatus 100 can display a web page including a plurality of article links, as shown in (a) of FIG. 11. At this time, a summary icon 1110 for receiving a document summary command for the representative link is displayed around the representative link (i.e., the link located at the uppermost position) among the plurality of article links.

When the icon 1110 is selected, the electronic apparatus 100 may transmit information on the representative link to the document summary apparatus 200, and the document summary apparatus 200 may input information regarding the representative link to a document summary model and obtain a summary text regarding an article corresponding to the representative link. At this time, the electronic apparatus 100 may transmit the summary setting information and the user history information together with the representative link information, and the document summary apparatus 200 may generate the summary text based on the summary setting information and the user history information.

The document summary apparatus 200 may transmit a generated summary text to the electronic apparatus 100, and the electronic apparatus 100 may provide a summary text in a pop-up type as illustrated in (b) of FIG. 11.

If one of the words (or phrases, phrases) included in the summary text is selected while the summary text is provided, the electronic apparatus 100 may transmit information on the selected word to an external search server. For example, if the word "terminal high altitude area defense (THAAD)" is selected from the words included in the summary text shown in (b) of FIG. 11, the electronic apparatus 100 may request detailed information on the word selected by a user to an external search server.

When detailed information on a word selected from an external search server is received, the electronic apparatus 100 may display detailed information or additional information on the selected work within a summary text as illustrated in (c) of FIG. 11.

In the above embodiment, the external search server provides detailed information or additional information on a word selected by the user, but this is merely exemplary and the electronic apparatus 100 may request detailed information or additional information to the document summary apparatus 200. Here, the document summary apparatus 200 can acquire detailed information or additional information on the selected word using the document used to generate the summary text. That is, the document summary apparatus 200 may acquire detailed information or additional information on the selected word in the existing document and provide it to the electronic apparatus 100.

FIG. 12 is a diagram illustrating providing summary information according to an embodiment.

When a summary text is received from the document summary apparatus 200, the electronic apparatus 100 may provide a summary text by various methods.

Specifically, as shown in (a) of FIG. 12, the electronic apparatus 100 may display a marker 1210 in a word or sentence corresponding to the summary text on an existing document (for example, an article) and provide a summary text. Here, the electronic apparatus 100 may generate a separate layer capable of displaying the marker 1210 at the position of the sentence or the word corresponding to the summary text on the document, and display the marker 1210 overlaid on the document. Alternatively, the electronic apparatus 100 may modify the script of the document to display the marker 1210 on the document, and may generate and display a separate document image in which the marker 1210 is displayed in the summary text portion. Meanwhile, in the above-described embodiment, in order to provide the summary text, the marker is displayed on the portion corresponding to the summary text on the document. However, this is merely exemplary, and a text corresponding to a summary text can be displayed to be distinguished from other texts. For example, the electronic apparatus 100 may display the size, font, thickness, brightness, color, etc. of the text corresponding to the summary text on the document differently from other texts.

In addition, the electronic apparatus 100 may display a pop-up screen 1220 that includes summary text on a document (e.g., an article), as shown in (b) of FIG. 12. At this time, the pop-up screen 1220 may be displayed at the top of the screen not to interfere with the display of an existing article. However, the pop-up screen 1220 can be resized by user's manipulation, and the display position can be changed.

As still another example, the electronic apparatus 100 may display a full screen including a summary text, and may store a summary text in the memory 120 within the electronic apparatus 100 or in an external cloud server.

Figure 13:
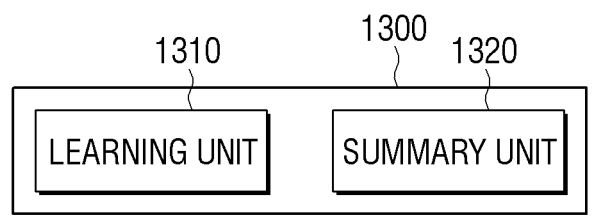
FIG. 13 is a block diagram illustrating a configuration of an electronic device according to an embodiment.

FIG. 13 is a block diagram illustrating a configuration of an electronic device according to an embodiment.

Referring to FIG. 13, the electronic device may include a processor 1300, which may implement at least one of a learning unit 1310 and a summary unit 1320 when executing a summary information generating program according to computer-readable instructions. The processor 1300 of FIG. 13 may correspond to the processor 140 of the electronic apparatus 100 as illustrated in FIG. 2A-B.

The learning unit 1310 may generate or train a document summary model having a criterion for summarizing the document and generating summary information. The learning unit 1310 may generate a document summary model capable of generating summary information using the collected learning data. As an example, the learning unit 1310 may generate, train, or update a document summary model for determining a criterion for generating summary information for a document using a document containing text as learning data.

At this time, the learning unit 1310 may evolve the document summary model to have a criterion for generating different summary information according to the type of the document. Specifically, the learning unit 1310 can learn the document summary model to generate summary information on different criteria depending on whether the input document is an article, a paper, a recipe document, or the like. For example, if the document input as the learning data is an article, the learning unit 1310 can learn the document summary model to extract the key word of the article and generate the summary information focused on the result delivery. When the document which is input as learning data is paper, the learning unit 1310 may learn a document summary model to extract a summary or a word or a sentence included in the conclusion to generate summary information.

A summary unit 1320 may use predetermined document data as input data of the learned document summary model and generate summary information on the predetermined document. For example, the summary unit 1320 may use the document data including a text as input data of the trained summary unit and generate summary information on the document selected by the user.

At least a portion of the learning unit 1310 and at least a portion of the summary unit 1320 may be implemented as software modules or in the form of at least one hardware chip mounted in an electronic apparatus. For example, at least one of the learning unit 1310 and the summary unit 1320 may be fabricated in the form of a dedicated hardware chip for artificial intelligence (AI), or a conventional general purpose processor such as a CPU or an application processor or graphics-only processor (e.g., a GPU) and may be mounted on the various electronic apparatuses or document summary apparatuses 200 described above. Herein, the dedicated hardware chip for artificial intelligence is a special processor specialized in probability calculation, and has a higher parallel processing performance than the conventional general processor, so that information may be quickly processed using artificial intelligence and machine learning. When the learning unit 1310 and the summary unit 1320 are implemented with a software module (or a program module including an instruction), the software module may be stored in a computer-readable non-transitory computer readable media. In this case, the software module may be provided by an operating system (OS) or by a predetermined application. Alternatively, some of the software modules may be provided by an Operating System (OS), and some of the software modules may be provided by a predetermined application.

In this case, the learning unit 1310 and the summary unit 1320 may be mounted on (or implemented by) one electronic apparatus or on separate electronic apparatuses, respectively. For example, one of the learning unit 1310 and the summary unit 1320 may be included in the electronic apparatus 100, and the other one may be included in an external server. The learning unit 1310 and the summary unit 1320 may provide the model information constructed by the learning unit 1310 to the summary unit 1320 via a wired or wireless network, and data that is input to the summary unit 1320 may be provided to the learning unit 1310 as additional learning data.

Figure 14A:
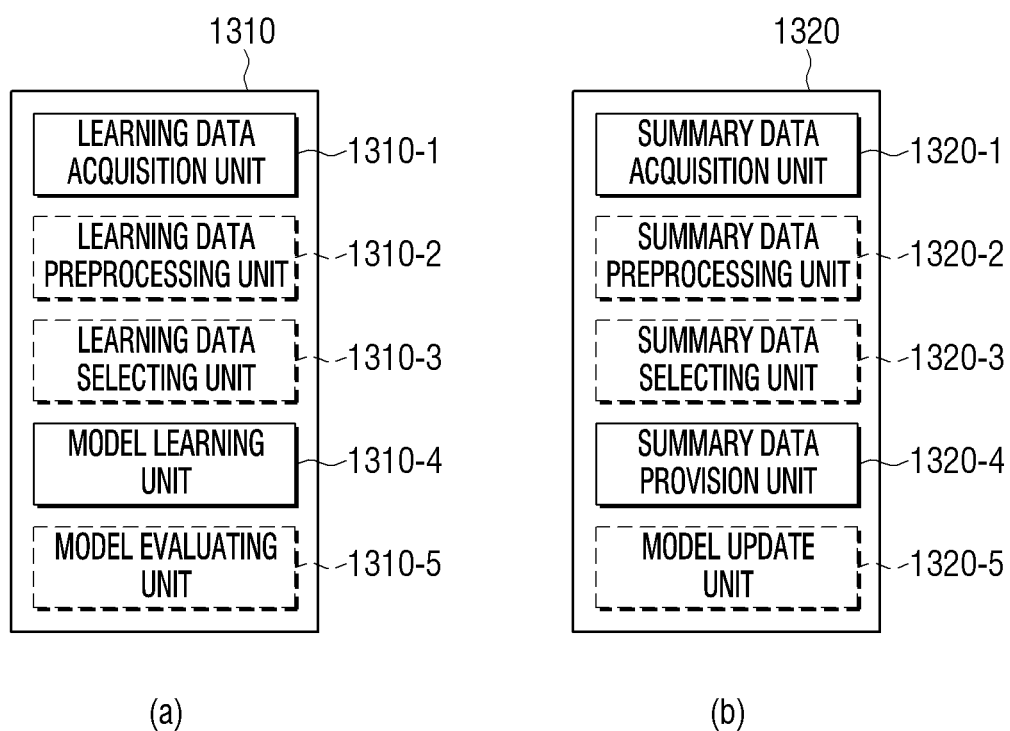
FIGS. 14A and 14B are block diagrams illustrating configurations of a learning unit and a summary unit according to an embodiment.
Figure 14B:
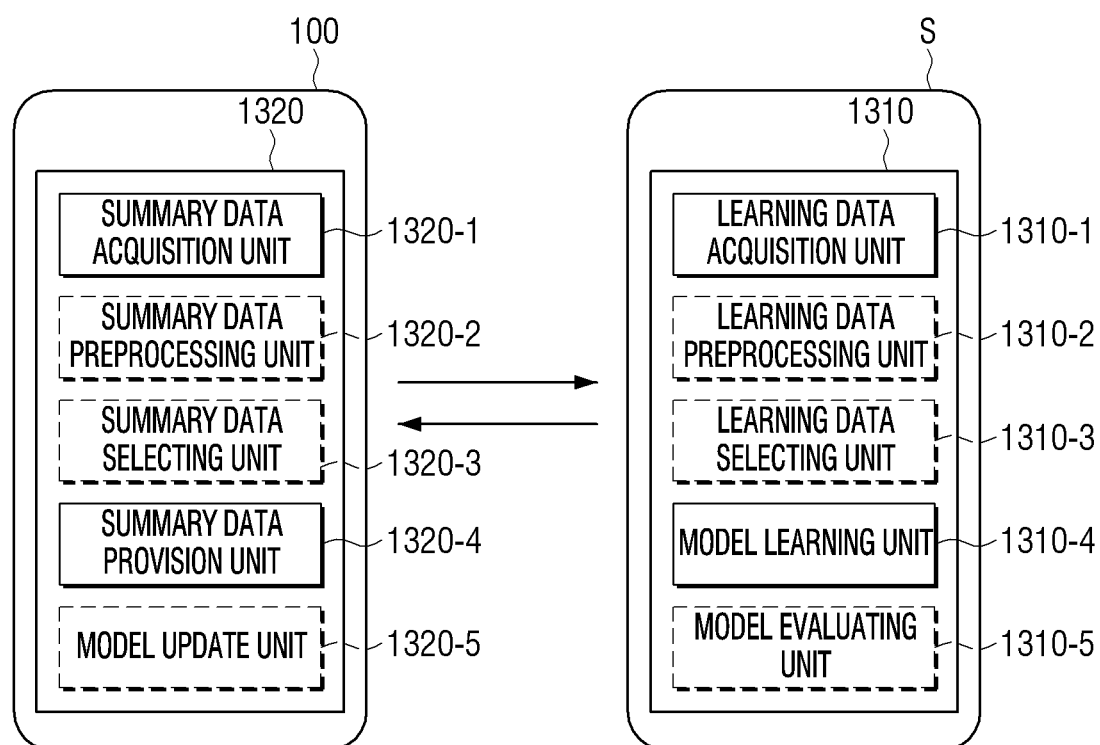

FIGS. 14A and 14B are block diagrams illustrating configurations of a learning unit and a summary unit according to an embodiment.

Referring to FIG. 14A, the learning unit 1310 may include a learning data acquisition unit 1310-1 and a model learning unit 1310-4. The learning unit 1310 may further include at least one of the learning data preprocessing unit 1310-2, the learning data selecting unit 1310-3, and the model evaluating unit 1310-5.

The learning data acquisition unit 1310-1 may acquire learning data necessary for a summary unit for generating summary information on a document. In the embodiment of the present disclosure, the learning data acquisition unit 1310-1 can acquire, as learning data, a document including text, such as a paper, an article, an e-book content and the like. The learning data may be data collected or tested by the learning unit 1310 or the manufacturer of the learning unit 1310.

The model learning unit—1310-4 can use the learning data so that the summary unit learns how to summarize a predetermined document. For example, the model learning unit 1310-4 may extract key words based on the occurrence frequency of words included in the document, the position of the words, the relationship with the words, and extract the summary information using the extracted key words. Also, the model learning unit 1310-4 can train the summary unit to generate summary information using a plurality of documents. Specifically, the model learning unit 1310-4 can train the summary unit to generate the summary information based on words common to the words included in the plurality of documents.

In particular, the model learning unit 1310-4 can train the summary unit by supervised learning using at least some of the learning data as a criterion. Alternatively, the model learning unit 1310-4 may train the summary unit by using the learning data without any supervision by self-learning, through unsupervised learning for finding a criterion for generating the summary information. Also, the model learning unit 1310-4 can train the summary unit through reinforcement learning using, for example, feedback as to whether the result of the situation judgment based on learning is correct. Also, the model learning unit 1310-4 can train the summary unit by using, for example, a learning algorithm including an error back-propagation method or a gradient descent.

In addition, the model learning unit 1310-4 may learn a selection criterion regarding which learning data should be used to generate summary information by using input data.

The model learning unit 1310-4 may determine a summary unit to train a summary unit having a large relevance between the input learning data and the basic learning data, when a plurality of predefined summary units exist. In this case, the basic learning data may be pre-classified according to the data type, and the summary unit may be pre-built according to the type of data. For example, the basic learning data may be pre-classified by various criteria such as an area where the learning data is generated, a time at which the learning data is generated, a size of the learning data, a genre of the learning data, and a creator of the learning data. For example, the model learning unit 1310-4 may generate a first document summary model for generating summary information for an article and a second document summary model for generating summary information for the article.

When the model is learned, the model learning unit 1310-4 can store the learned document summary model. In this case, the model learning unit 1310-4 can store the learned document summary model in the memory 130 of the electronic apparatus 100. Alternatively, the model learning unit 1310-4 may store the learned document summary model in the memory of the server connected to the electronic apparatus 100 via a wired or wireless network.

The learning unit may further include a learning data pre-processor 1310-2 and a learning data selecting unit 1310-3, to improve a result of a document summary model or save resources or time that are needed for generation of the document summary model.

The learning data preprocessing unit 1310-2 can preprocess acquired data so the acquired data can be used for learning for generating summary information. The learning data preprocessing unit 1310-2 can process the acquired data into a predetermined format so the model learning unit 1310-4 can use the data acquired for learning for generating the summary information.

The learning data selecting unit 1310-3 can select the data acquired by the learning data acquisition unit 1310-1 or the data required for the learning from the data preprocessed by the learning data preprocessing unit 1310-2. The selected learning data may be provided to the model learning unit 1310-4. The learning data selecting unit 1310-3 can select the learning data necessary for learning from the acquired or preprocessed data according to a predetermined selection criterion. For example, the learning data selecting unit 1310-3 can select only text-related data among the input document data as learning data. In addition, the learning data selecting unit 1310-3 may also select the learning data according to a predetermined selection criterion by learning by the model learning unit 1310-4.

The learning unit 1310 may further include a model evaluating unit 1310-5 to improve an output result of the document summary model.

The model evaluating unit 1310-5 may input evaluation data to a document summary model, and if an output result from the evaluation data does not satisfy a predetermined criterion, the model evaluation may let the model learning unit 1310-4 iteratively conduct learning for any number of iterations. In this case, the evaluation data may be predetermined data to evaluate the document summary model.

For example, the model evaluating unit 1310-5 may evaluate that a predetermined criterion is not satisfied, if the number or ratio of the evaluation data, from among an output result of the learned document summary model, of which output data is not correct exceeds a predetermined threshold value.

In contrast, when there are a plurality of learned document summary models, the model evaluating unit 1310-5 may evaluate whether each of the learned document summary models satisfies a predetermined criterion, and determine a model which satisfies a predetermined model as a final document summary model. In this case, when there are a plurality of models satisfying the predetermined criterion, the model evaluating unit 1310-5 can determine any one or a predetermined number of models preset in descending order of evaluation score as a final document summary model.

Referring to FIG. 14A, the summary unit 1320 may include a summary data acquisition unit 1320-1 and a summary data provision unit 1320-4. The summary unit 1320 may further include, in a selective manner, at least one of a summary data preprocessing unit 1320-2, a summary data selecting unit 1320-3, and a model update unit 1320-5.

The summary data acquisition unit 1320-1 may acquire document data necessary for generating summary information. The summary data provision unit 1320-4 can generate summary information by applying the data obtained by the summary data obtaining unit 1320-1 to the trained document summary model as an input value. The summary data provision unit 1320-4 may provide summary information according to the type of the input document. The summary data provision unit 1320-4 may apply the data selected by the summary data preprocessing unit 1320-2 or the summary data selecting unit 1320-3 to the document summary model to obtain summary information.

As an embodiment, the summary data provision unit 1320-4 may apply document data which includes a text obtained from the summary data obtaining unit 1320-1 to the trained document summary model to generate summary information.

The summary unit 1320 may include a summary data preprocessing unit 1320-2 and a summary data selecting unit 1320-3 to improve the output result of the document summary model or to save resources or time for providing output results.

The summary data preprocessing unit 1320-2 can preprocess acquired data so document data can be used as summary data. The summary data preprocessing unit 1320-2 can process the acquired data into a predefined format so the summary data provision unit 1320-4 can use the data obtained for generating the summary information.

The summary data selecting unit 1320-3 may select data necessary for generating summary information from the data acquired by the summary data acquisition unit 1320-1 or the data preprocessed by the summary data preprocessing unit 1320-2. The selected data may be provided to the summary data provision unit 1320-4. The summary data selecting unit 1320-3 may select some or all of the acquired or preprocessed data according to a predetermined selection criterion for generating summary information. In addition, the summary data selecting unit 1320-3 may select data according to a predetermined selection criterion by learning by the model learning unit 1310-4.

The model updating unit 1320-5 can control the document summary model to be updated based on the evaluation of the output result provided by the summary data provision unit 1320-4. For example, the model updating unit 1320-5 provides the model learning unit 1310-4 with the output result provided by the summary data provision unit 1320-4 so the model learning unit 1310-4 can request to learn or update the document summary model additionally.

Referring to FIG. 14B, an external server (S) may learn a document summary model for generating summary information, and the electronic apparatus 100 may generate summary information based on the learning result by the server (S).

In this case, the model learning unit 1310-4 of the server (S) may perform a function of the learning unit 1310 as illustrated in FIG. 13. The model learning unit 1310-4 of the server (S) may learn criterion regarding how to generate summary information.

In addition, the summary data provision unit 1320-4 of the electronic device 100 may apply the document data selected by the summary data selecting unit 1320-3 to the document summary model generated by the server (S) to obtain summary information of a document. Alternatively, the summary data provision unit 1320-4 of the electronic device 100 may receive the document summary model generated by the server (S) from the server (S) and generate summary information using the received document summary model. In this case, the summary data provision unit 1320-4 of the electronic device 100 may apply the document data selected by the summary data selecting unit 1320-3 to the document summary model received from the server (S) to obtain summary information on a document.

Figure 15:
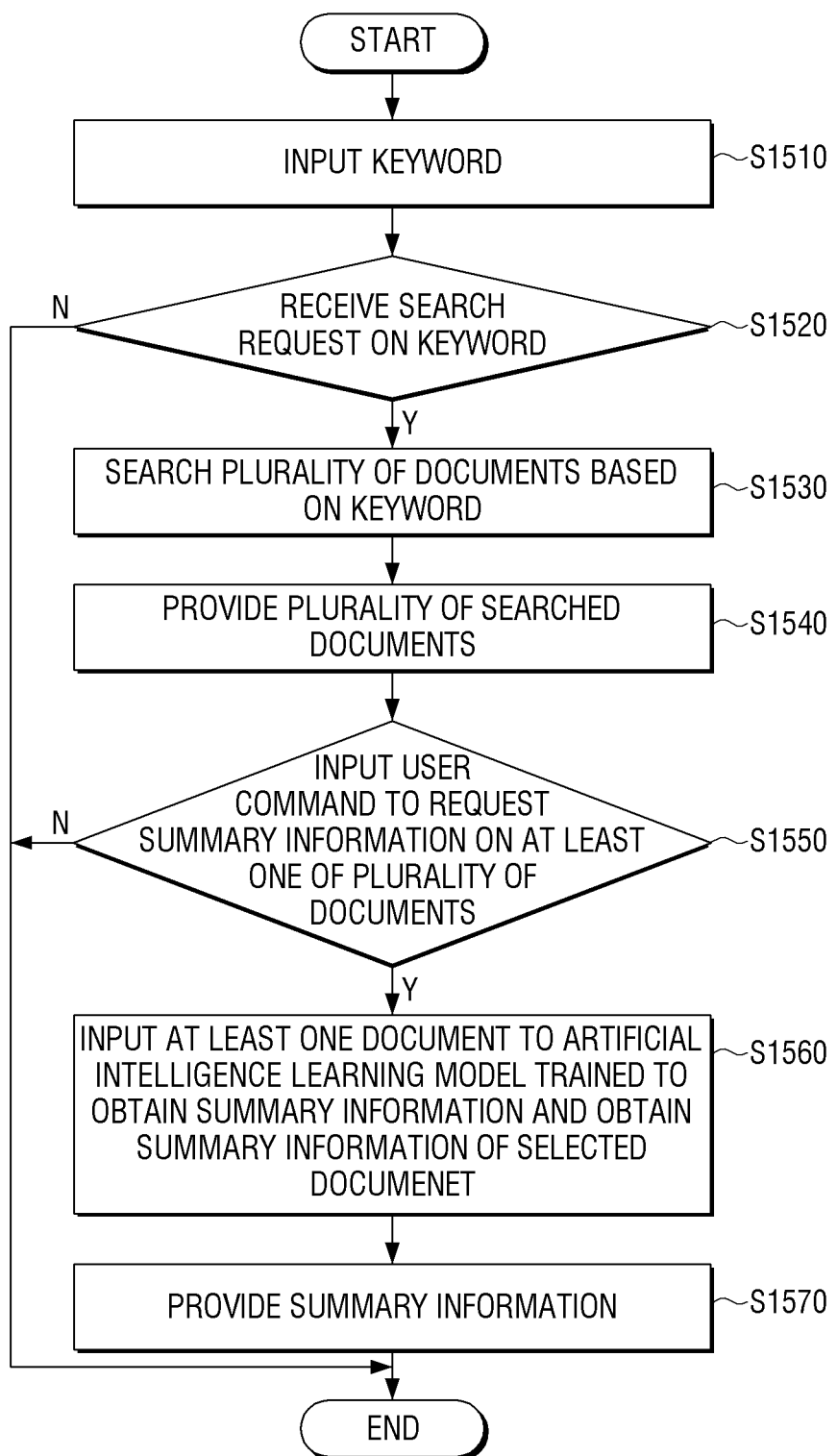
FIG. 15 is a flowchart of a method of inserting summary information according to an embodiment.

FIG. 15 is a flowchart of a method of inserting summary information according to an embodiment.

First, the electronic device 100 can receive a keyword in step S1510. At this time, the electronic device 100 can display the first document in the first area, display the search window in the second area, and display the input search word in the search window of the second area.

The electronic device 100 may determine whether a search request for a keyword has been received in step S1520. At this time, the search request for the keyword may be a user command for selecting an icon for selecting a search icon included in the search window.

When a search request for a keyword is received, the electronic device 100 may search for a plurality of documents based on the keyword in step S1530. Here, the electronic device 100 can search a plurality of documents stored in the electronic device 100, but this is merely an example, and a plurality of documents stored in an external search server (or a cloud server) may be searched.

The electronic device 100 may provide a plurality of searched documents in step S1540. Here, the electronic device 100 may provide a plurality of searched documents in the second area as a result of the search.

The electronic device 100 may determine whether a user command for requesting summary information of at least one of the plurality of documents has been input in step S1550. At this time, the user command for requesting the summary information of at least one of the plurality of documents may be a user command to select at least one of the plurality of documents and drag the selected document to a point of the first area in which the first document is displayed.

The electronic device 100 may acquire summary information of the selected document by inputting the selected document into the artificial intelligence learning model to obtain summary information in step S1560. Here, the artificial intelligence learning model is a model for acquiring summary information, and can generate summary information based on information about a document, summary setting information, user history information, and the like.

The electronic device 100 may insert the summary information into another document in step S1570. Specifically, the electronic device 100 may insert the summary information at the point at which a user command is entered in another document. At this time, the electronic device 100 can distinguish the summary information from other texts, and can provide citation information together with the summary information.

FIGS. 16 to 19 are flowcharts illustrating methods of a network system using a summary model according to various embodiments.

In FIGS. 16 through 19, a network system using a document summary model includes first components 1601, 1701, 1801, 1901, second components 1602, 1702, 1802, 1902, and third component 1703.

Here, the first components 1601, 1701, 1801, 1901 may be the electronic device 100, and the second components 1602, 1702, 1802, 1902 may be a server that stores the text summary model. Alternatively, the first components 1601, 1701, 1801, and 1901 may be general purpose processors and the second components 1602, 1702, 1802, and 1902 may be artificial intelligence dedicated processors. Alternatively, the first component 1601, 1701, 1801, 1901 can be at least one application, and the second component 1602, 1702, 1802, 1902 can be an operating system (OS).

That is, the second components 1602, 1702, 1802, 1902 may be more integrated, dedicated, delay less, or be performance dominant as a component with a large number of resources, and can be a component that can process many operations required to create, update, or apply an AI training model more quickly and efficiently than the first components 1601, 1701, 1801, 1901.

In this case, an interface that can receive and transfer data between the first components 1601, 1701, 1801, 1901 and second components 1602, 1702, 1802, 1902 can be defined.

For example, an application program interface (API) having an argument value (or an intermediate value or a transfer value) to be applied to the artificial intelligence learning model may be defined. An API can be defined as a set of subroutines or functions that can be invoked for any processing of another protocol (e.g., a protocol defined in a server) in any one protocol (e.g., a protocol defined in the electronic device 100). That is, an environment can be provided in which an operation of another protocol can be performed through any one protocol through an API.

On the contrary, the third component 1703 can collect and provide other documents related to the document based on the data received by at least one of the first component 1701 and the second component 1702. The third component 1703, for example, may correspond to the document collection device 300 of FIG. 2C. At this time, the data received by the third component 1703 may be, for example, information on the document selected by the user.

Figure 16:
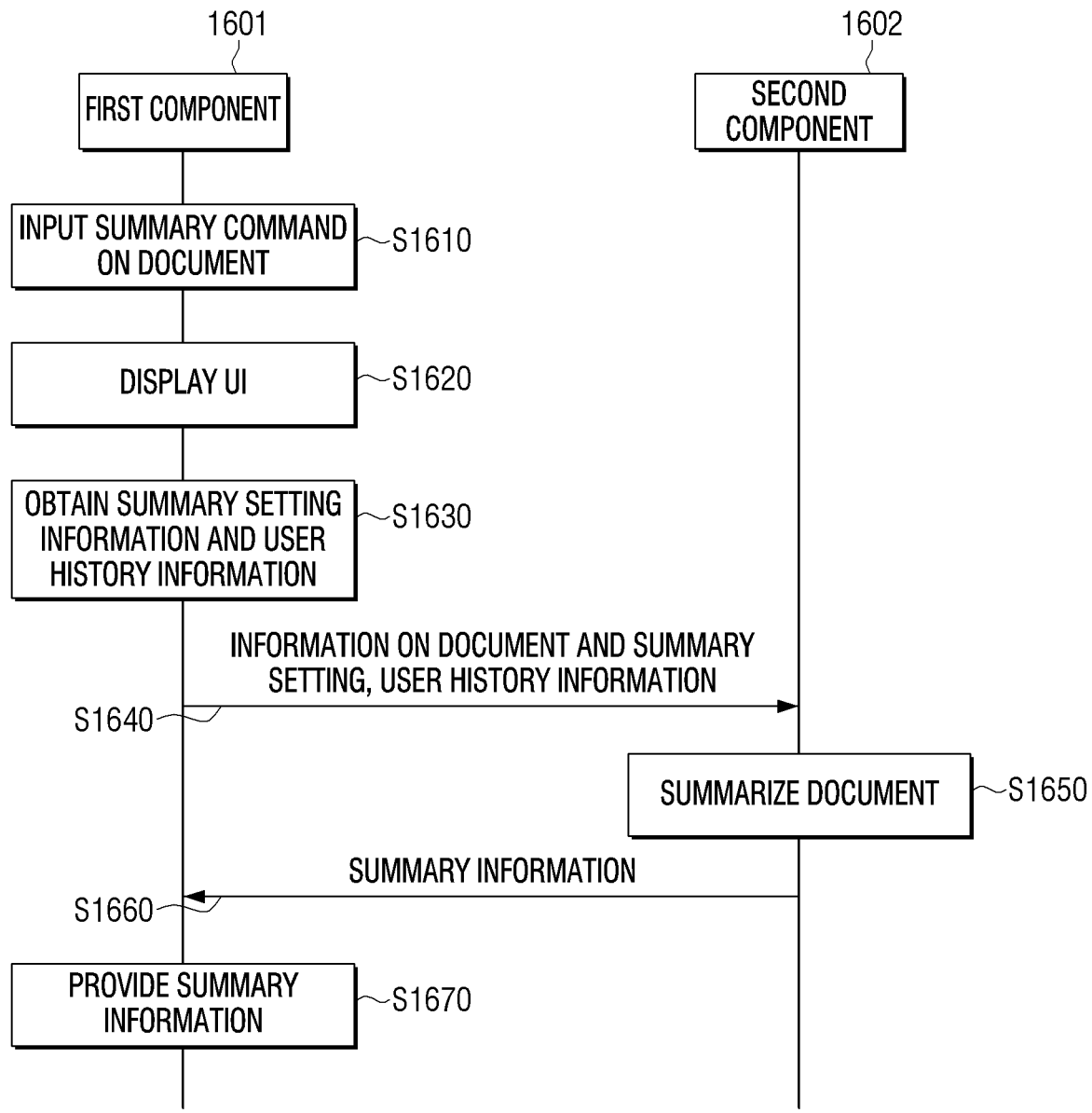
FIGS. 16, 17, 18, and 19 are flowcharts illustrating methods of a network system using a summary model according to various embodiments.

In one embodiment, in FIG. 16, the first component 1601 can receive a summary command for a document in step S1610. Here, the summary command for the document may include, but is not limited to, an instruction to select a summary icon included in the document, an instruction to select at least one of the plurality of documents retrieved, and the like, but is not limited thereto.

The first component 1601 may display a UI in step S1620. Here, the UI may be for generating summary setting information and for setting length or tone of summary information.

The first component 1601 may obtain summary setting information and user history information in step S1630. Here, the first component 1601 can acquire the summary setting information according to the user command inputted through the UI, and can obtain the user history information including the user profile information and the usage history information.

The first component 1601 may transmit information on a document, summary setting information, and user history information to the second component 1602 in step S1640.

The second component 1602 may perform document summary based on the obtained information. Specifically, the second component 1602 may apply the information on the acquired document to the AI model as input data to generate summary information. Here, the second component 1602 can generate the summary information by setting the parameters of the summary information based on the obtained summary setting information and the user history information.

The second component 1602 may transmit summary information to the first component 1601 in step S1660.

The first component 1601 may provide the generated summary information in step S1670. Here, the first component 1601 may provide the generated summary information on a separate screen, and may provide a marker to a portion corresponding to the summary information of the currently displayed document.

Figure 17:
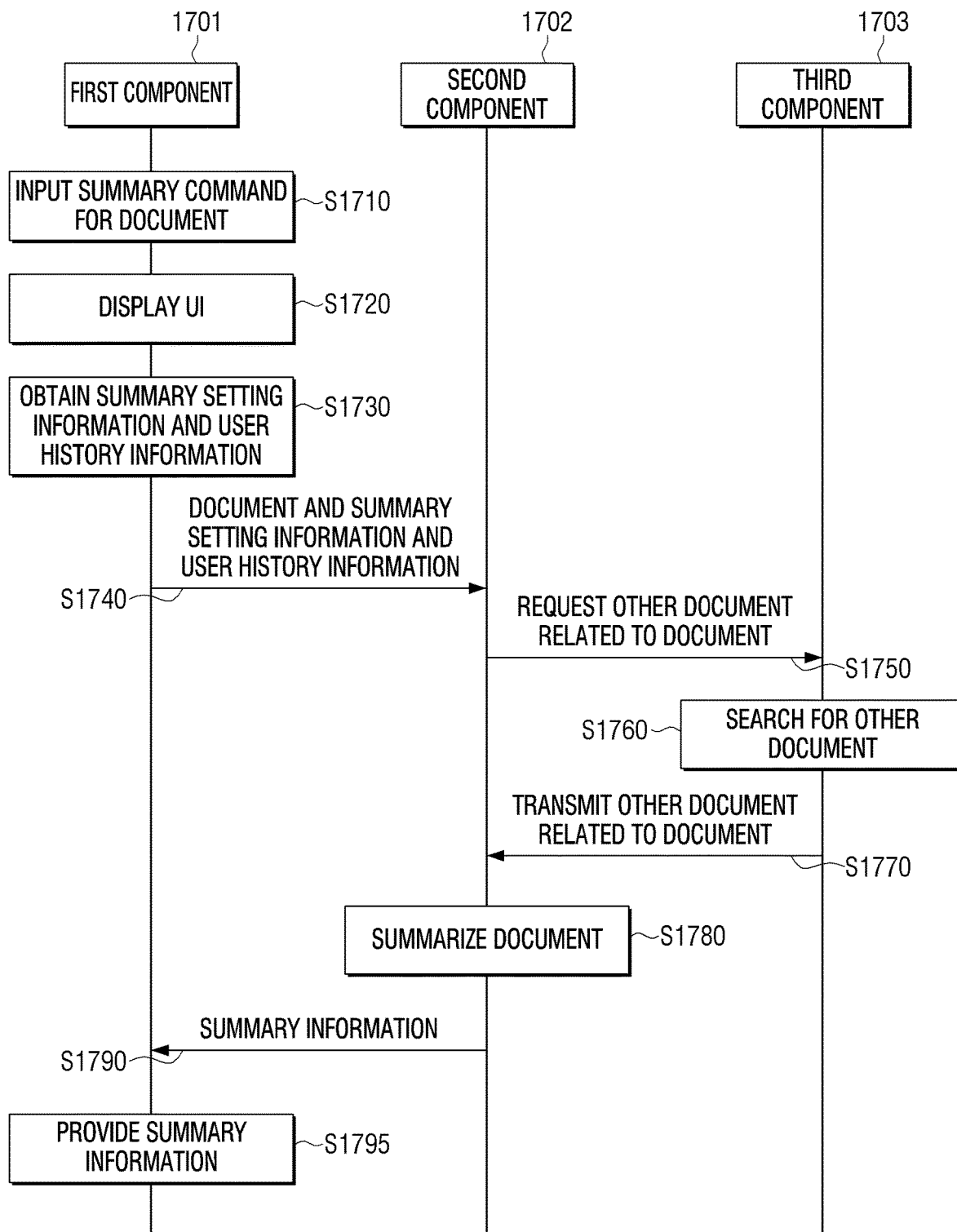

In another embodiment, in FIG. 17, the first component 1701 may receive a summary command for a document in step S1710 and display the UI in step S1720. The first component 1701 may acquire the summary setting information through the UI and obtain user history information in step S1730. Then, the first component 1701 may transmit information about the document, summary setting information, and user history information to the second component 1702 in step S1740. Steps S1710 to S1740 of FIG. 17 correspond to steps S1610 to S1640 of FIG. 16, and duplicate descriptions are omitted.

The second component 1702 may request to search for another document related to the document to the third component 1703 in step S1750. Here, the request may include information on a document.

The third component 1703 can search for another document based on the information about the document in step S1760. In this case, the other document that is a result of the search is related to the document that is an input to the search. For example, if the document is an article, the other document is related article or a subsequent article. If the document is a paper, another document may be a paper of the same field.

The third component 1703 may provide the search result of another document related to the document to the second component 1702 in step S1770.

The second component 1702 may summarize the document using information about the document and other documents related to the document in step S1780. Specifically, the second component 1702 may obtain summary information by applying information about the document and other documents related to the document to the learned AI learning model as input data. Here, the artificial intelligence learning model can generate summary information based on words (or sentences, phrases) included in both documents and other related documents. In addition, the second component 1702 can generate summary information by setting parameters of the artificial intelligence learning model based on the summary setting information and user history information acquired from the first component 1701.

The second component 1702 may transmit summary information to the first component 1701 in step S1790. The first component 1701 may provide the generated summary information in step S1795.

Figure 18:
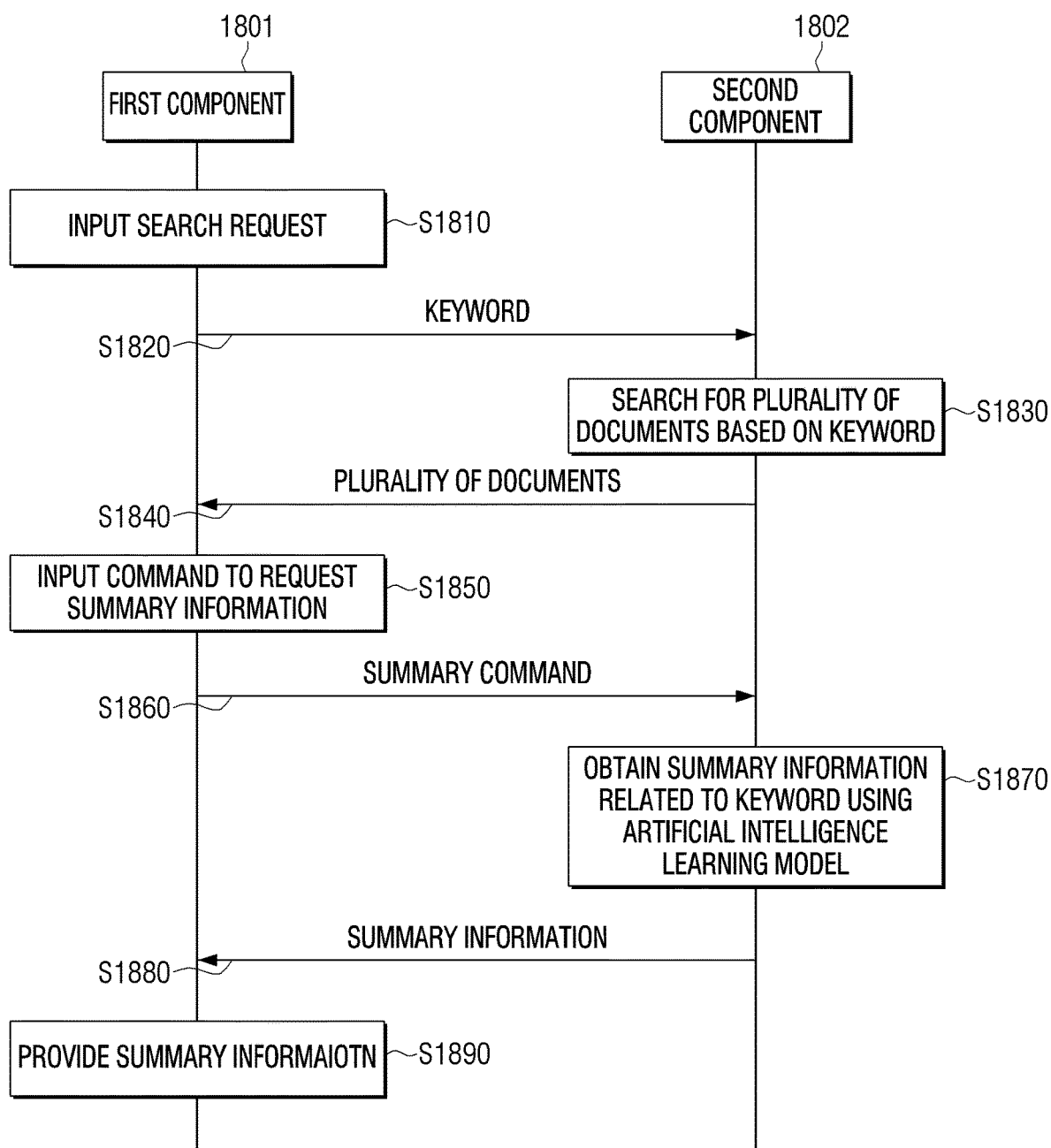

In another embodiment, in FIG. 18, the first component 1801 may receive a search request in step S1810. Specifically, the first component 1801 can receive a search request for searching a plurality of documents based on a keyword input by a user. Here, the keyword may be a keyword that is input in the search window of the web browser.

The first component 1801 may transmit information on the keyword to the second component 1802 in step S1820.

Here, the second component 1802 may search for a plurality of documents based on a keyword in step S1830. The second component 1802 may transmit the plurality of searched documents to the first component 1801 in step S1840.

The first component 1801 may receive a command for requesting summary information of at least one of the plurality of documents in step S1850. The first component 1801 may send a summary command to the second component 1802 in step S1860. Here, the summary command may include information on at least one document and information about the keyword. Also, if the summary setting information is obtained via the UI or if the user history information is acquired, the first component 1801 may transmit summary setting information or user history information to the second component 1802 along with the request command.

The second component 1802 may obtain summary information related to a keyword using the artificial intelligence learning model in step S1870. Specifically, when a user command for requesting summary information of at least one of the plurality of documents is received, the second component 1802 may input at least one of the plurality of documents to the artificial intelligence learning model that is trained to acquire the summary information to obtain summary information about at least one document related to the keyword.

The second component 1802 may transmit the summary information to the first component 1801 in step S1880.

The first component 1801 may provide received summary information in step S1890.

Figure 19:
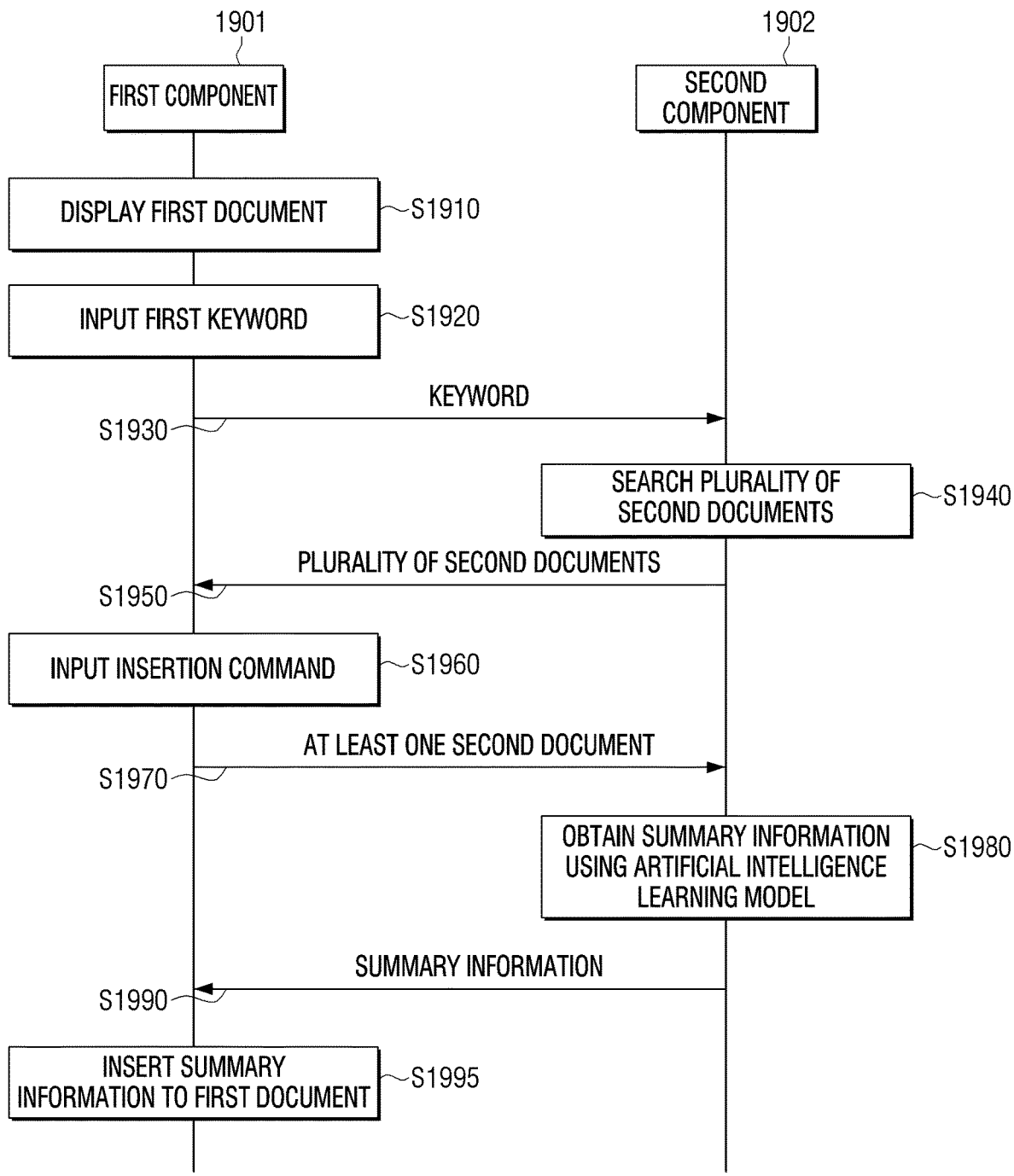

As another embodiment, in FIG. 19, the first component 1901 may display the first document in step S1910.

The first component 1901 may receive a keyword by a user in step S1920. Here, the first component 1901 may transmit a keyword to the second component 1902 in step S1930.

The second component 1902 may search for a plurality of second documents based on a keyword in step S1940. The second component 1902 may transmit the plurality of searched second documents to the first component 1901 in step S1950.

The first component 1901 may receive an insert command for inserting at least a portion of the plurality of second documents into the first document in step S1960. Here, the insert command may be a command to select a part of the plurality of retrieved second documents and drag the selected first document to a position desired by the user to insert.

The first component 1901 may transmit at least one second document to the second component 1902 in step S1970.

The second component 1902 may acquire the summary information using the artificial intelligence learning model in step S1980. Specifically, the second component 1902 may input at least one of the plurality of second documents to the artificial intelligence learning model which is learned to acquire the summary information to obtain summary information about at least one second document related to the keyword.

The second component 1902 may transmit summary information to the first component 1901 in step S1990.

The first component 1901 may insert summary information to the first document in step S1995.

Figure 20:
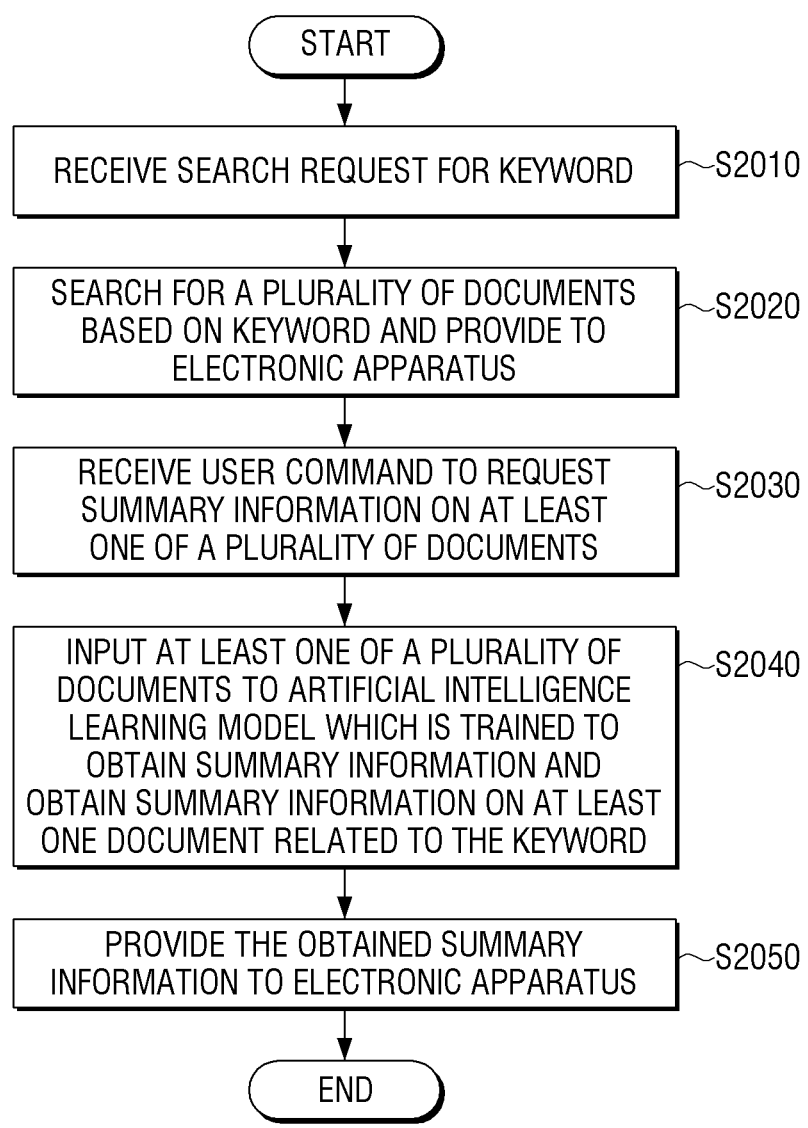
FIGS. 20 and 21 are flowcharts illustrating methods of a server and an electronic device providing summary information according to various embodiments.

FIG. 20 is a flowchart illustrating a method of a server for providing summary information according to an embodiment.

The server may receive a search request for a keyword in step S2010.

The server may search for a plurality of documents based on a keyword and provide the documents to the electronic device 100 in step S2020.

The server may receive a user command to request summary information regarding at least one of the plurality of searched documents in step S2030.

The server may input at least one of the plurality of documents into the learned AI model to acquire summary information to obtain summary information about at least one document related to the keyword in step S2040.

The server 200 may provide the obtained summary information to the electronic device 100 in step S2050.

Figure 21:
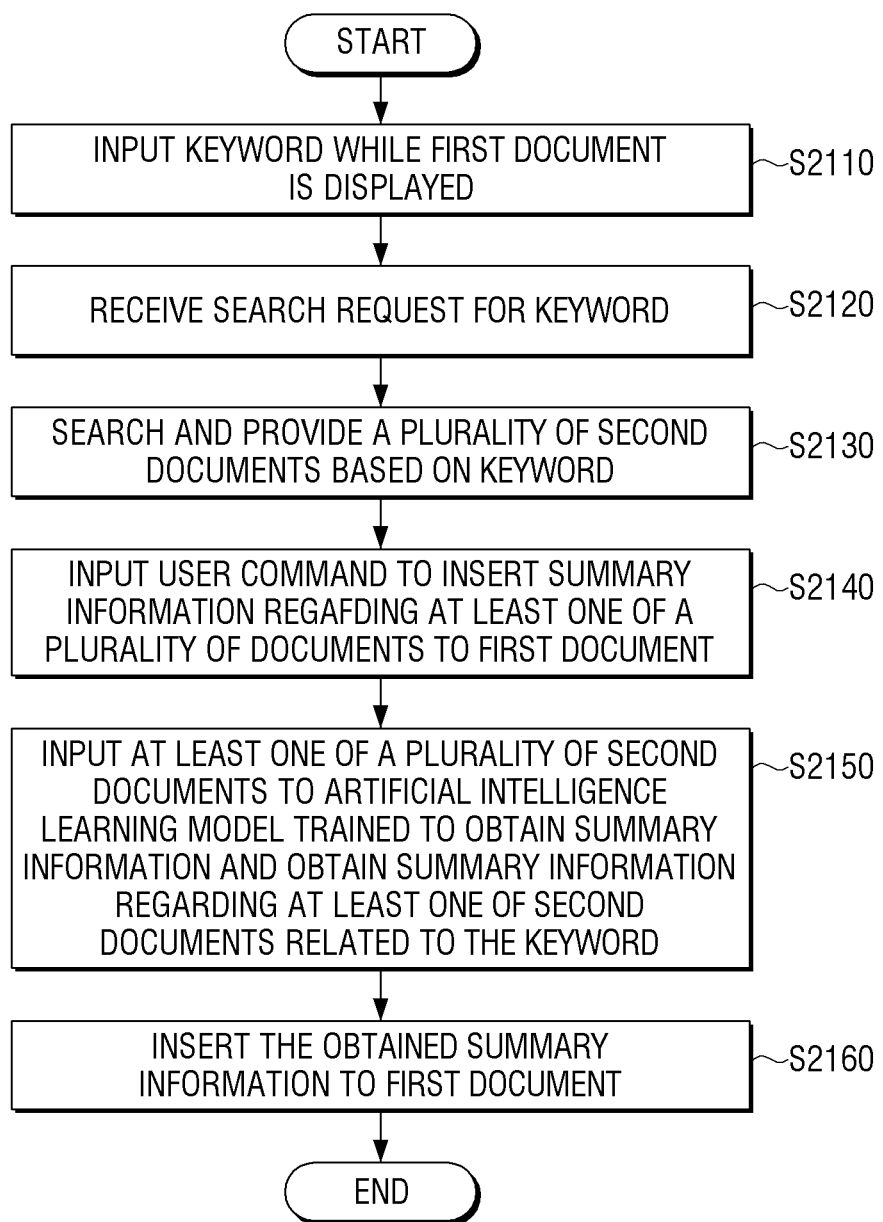

FIG. 21 is a flowchart illustrating a method of an electronic device for providing summary information according to an embodiment.

The electronic device 100 may receive a keyword while the first document is being displayed in step S2110.

The electronic device 100 may receive a request for search of a keyword in step S2120.

The electronic device 100 may search for a plurality of second documents based on a keyword and provide the same in step S2130.

The electronic device 100 may receive a user instruction to insert summary information on at least one of a plurality of second documents to the first document in step S2140.

The electronic device 100 may input at least one of a plurality of second documents in the AI learning model that is learned to obtain summary information to obtain summary information about at least one second document related to the keyword in S2150.

The electronic device 100 may insert obtained summary information on the first document in step S2160.

The term "module" as used in this disclosure includes units composed of hardware, software, or firmware and may be used interchangeably with terms such as, for example, logic, logic blocks, components, or circuits. A module may be an integrally constructed component or a minimum unit or part thereof that performs one or more functions. For example, a module may be configured as an application-specific integrated circuit (ASIC).

Various embodiments of the present disclosure may be implemented in software, including instructions stored on a machine-readable storage medium, such as a machine (e.g., a computer). A device is a device which calls stored instructions from a storage medium and is operable according to the called instructions, and may include an electronic device (e.g., electronic device 100) according to the embodiments. When the instructions are executed by a processor, the processor may perform a function corresponding to the instructions directly or by using other components under the control of the processor. The instructions may include code generated or executed by the compiler or interpreter. The machine-readable storage medium may be provided in the form of a non-transitory storage medium. Here, "non-transitory" means that the storage medium does not include a signal and is tangible, but does not distinguish whether data is permanently or temporarily stored in a storage medium.

According to an embodiment, a method according to various embodiments disclosed herein may be provided in a computer program product. A computer program product may be traded between a seller and a purchaser as a commodity. A computer program product may be distributed in the form of a machine readable storage medium (e.g., compact disc read only memory (CD-ROM)) or distributed online through an application store (e.g. PlayStore™). In the case of on-line distribution, at least a portion of the computer program product may be temporarily stored, or temporarily created, on a storage medium such as a manufacturer's server, a server of an application store, or a memory of a relay server.

Each of the components (such as a module or a program) according to various embodiments may be composed of a single entity or a plurality of entities, and some subcomponents of the aforementioned subcomponents may be omitted, or other components may be further included in various embodiments.

Alternatively or additionally, some components (e.g., modules or programs) may be integrated into one entity to perform the same or similar functions performed by each respective component prior to integration. Operations performed by a module, program, or other component, in accordance with various embodiments, may be performed sequentially, in a parallel, repetitively, or heuristically, or at least some operations may be performed in a different order or omitted, or another operation can be added.

While the embodiments has been shown and described with reference to certain preferred embodiments thereof, it will be understood by those skilled in the art that various changes in form and details may be made therein without departing from the spirit and scope of the disclosure as defined by the appended claims. Therefore, the scope is defined not by the detailed description of the invention but by the appended claims, and all differences within the scope will be construed as being included in the present disclosure.

What is claimed is:

1. An electronic device comprising:
a display;
a memory; and
a processor configured to:
control the display to display a first document on a first area of the display,
based on a first user command for inputting at least one keyword, control the display to display a plurality of documents corresponding to the at least one keyword on a second area different from the first area while the first document is displayed on the first area,
based on a second user command for obtaining summary information of a second document among the plurality of documents, control the display to display a user interface (UI) for setting at least one parameter related to obtaining the summary information, wherein the at least one parameter comprises a parameter for a tone of the summary information,
obtain one or more parameters based on a third user command input through the UI,
obtain the summary information of the second document based on the one or more parameters and the at least one keyword, and
provide the summary information of the second document,
wherein the processor is further configured to:
in response to the tone of the summary information being set to a negative tone through the UI, obtain the summary information based on the at least one keyword and at least one negative word among words included in the second document, and
in response to the tone of the summary information being set to a positive tone through the UI, obtain the summary information based on the at least one keyword and at least one positive word among the words included in the second document.

2. The electronic device of claim 1, wherein the at least one parameter comprises at least one of a parameter for a length of the summary information.

3. The electronic device of claim 1, wherein the at least one parameter comprises a first parameter set through the UI and a second parameter set based on user history information.

4. The electronic device of claim 1, wherein the processor is further configured to, based on a fourth user command for inserting the summary information in the first document, provide the first document including the summary information.

5. The electronic device of claim 4, wherein the third user command is received based on a user touch input on the display, and
wherein a position at which the summary information is inserted in the first document is determined according to a position of the user touch on the display.

6. The electronic device of claim 4, wherein the first document comprises a text document including text information,
wherein the summary information comprises summary text information, and
wherein the summary information is inserted into the first document by separating the text information into first text information and second text information, and inserting the summary text information between the first text information and the second text information.

7. The electronic device of claim 1, wherein the processor is further configured to, based on that a table of contents is included in the second document, obtain the summary information based on the table of contents.

8. The electronic device of claim 1, wherein the processor is further configured to, based on a fourth user command for obtaining summary information regarding the second document and a third document among the plurality of documents, obtain the summary information regarding the second document and the third document by setting a high weight for text commonly included in the second document and the third document.

9. The electronic device of claim 1, wherein the summary information is received from an external device connected to the electronic device.

10. The electronic device of claim 1, wherein the tone comprises at least one of the positive tone, the negative tone, a tone corresponding to a particular political orientation, or a tone corresponding to a particular knowledge level.

11. A method for controlling an electronic device, the method comprising:
displaying a first document on a first area of a display of the electronic device;
based on a first user command for inputting at least one keyword, displaying a plurality of documents corresponding to the at least one keyword on a second area different from the first area while the first document is displayed on the first area;
based on a second user command for obtaining summary information of a second document among the plurality of documents, displaying a user interface (UI) for setting at least one parameter related to obtaining the summary information, wherein the at least one parameter comprises a parameter for a tone of the summary information;
obtaining one or more parameters based on a third user command input through the UI, obtaining the summary information of the second document based on the one or more parameters and the at least one keyword; and providing the summary information of the second document, wherein the providing the summary information further comprises:
  in response to the tone of the summary information being set to a negative tone through the UI, obtain the summary information based on the at least one keyword and at least one negative word among words included in the second document, and
  in response to the tone of the summary information being set to a positive tone through the UI, obtain the summary information based on the at least one keyword and at least one positive word among the words included in the second document.

12. The method of claim 11, wherein the at least one parameter comprises at least one of a parameter for a length of the summary information.

13. The method of claim 11, wherein the at least one parameter comprises a first parameter set through the UI and a second parameter set based on user history information.

14. The method of claim 11, wherein the providing the summary information of the second document comprises, based on a fourth user command for inserting the summary information in the first document, providing the first document including the summary information.

15. The method of claim 14, wherein the third user command is received based on a user touch input on the display, and
  wherein a position at which the summary information is inserted in the first document is determined according to a position of the user touch on the display.

16. The method of claim 11, wherein the obtaining summary information of the second document comprises, based on that a table of contents is included in the second document, obtaining the summary information based on the table of contents.

17. The method of claim 11, further comprises:
  based on a fourth user command for obtaining summary information regarding the second document and a third document among the plurality of documents, obtaining the summary information regarding the second document and the third document by setting a high weight for text commonly included in the second document and the third document.

18. The method of claim 11, wherein the summary information is received from an external device connected to the electronic device.

19. A computer-readable media storing thereon a program for a method for controlling an electronic device, the method comprising:
  displaying a first document on a first area of a display of the electronic device,
  based on a first user command for inputting at least one keyword, displaying a plurality of documents corresponding to the at least one keyword on a second area different from the first area while the first document is displayed on the first area,
  based on a second user command for obtaining summary information of a second document among the plurality of documents, displaying a user interface (UI) for setting at least one parameter related to obtaining the summary information, wherein the at least one parameter comprises a parameter for a tone of the summary information,
  obtaining one or more parameters based on a third user command input through the UI,
  obtaining the summary information of the second document based on the one or more parameters and the at least one keyword, and
  providing the summary information of the second document,
  wherein the providing the summary information further comprises:
    in response to the tone of the summary information being set to a negative tone through the UI, obtain the summary information based on the at least one keyword and at least one negative word among words included in the second document, and
    in response to the tone of the summary information being set to a positive tone through the UI, obtain the summary information based on the at least one keyword and at least one positive word among the words included in the second document.

* * * * *